United States Patent
DeBord et al.

(10) Patent No.: US 12,422,402 B2
(45) Date of Patent: Sep. 23, 2025

(54) METHODS AND APPARATUS FOR TRAPPING AND ACCUMULATION OF IONS

(71) Applicant: MOBILion Systems, Inc., Chadds Ford, PA (US)

(72) Inventors: John Daniel DeBord, West Grove, PA (US); Liulin Deng, Chester Springs, PA (US); Gordon A. Anderson, Benton City, WA (US)

(73) Assignee: MOBILion Systems, Inc., Chadds Ford, PA (US)

( * ) Notice: Subject to any disclaimer, the term of this patent is extended or adjusted under 35 U.S.C. 154(b) by 0 days.

(21) Appl. No.: 18/606,947

(22) Filed: Mar. 15, 2024

(65) Prior Publication Data
US 2024/0248062 A1    Jul. 25, 2024

Related U.S. Application Data

(63) Continuation of application No. 17/327,159, filed on May 21, 2021, now Pat. No. 11,953,466.
(Continued)

(51) Int. Cl.
*G01N 27/00*    (2006.01)
*G01N 27/622*    (2021.01)
(Continued)

(52) U.S. Cl.
CPC .......... *G01N 27/622* (2013.01); *H01J 49/061* (2013.01); *H01J 49/16* (2013.01)

(58) Field of Classification Search
CPC ...... G01N 27/622; H01J 49/061; H01J 49/16; H01J 49/062
(Continued)

(56) References Cited

U.S. PATENT DOCUMENTS

| 5,789,745 A | 8/1998 | Martin et al. |
| 6,791,078 B2 | 9/2004 | Giles et al. |

(Continued)

FOREIGN PATENT DOCUMENTS

| EP | 1942340 A1 | 7/2008 |
| GB | 2457769 A | 9/2009 |

(Continued)

OTHER PUBLICATIONS

Brodeur et al., "Experimental Investigation of the Ion Surfing Transport Method," Int'l Journal of Mass Spec., vol. 336, pp. 53-60, Feb. 2013 (8 pages).
(Continued)

*Primary Examiner* — Michael Maskell
(74) *Attorney, Agent, or Firm* — McCarter & English, LLP

(57) ABSTRACT

Methods and apparatus for ion accumulation are disclosed. An apparatus for ion accumulation includes multiple regions. A first region receives and transfers ions to a second region using a first drive potential. The second region is switchable between a first state where it generates a first electric field preventing ions from further movement and entering a third region, and a second state where it generates a second electric field that guides the ions toward the third region. When in the first state, the ions are prevented from further movement by the first electric field, which causes the ions to accumulate in the second region. When in the second state, the ions are moved from the second region to the third region by the second electric field. A method of accumulating ions involves switching an electric field applied to a region between a trap state and a release state.

22 Claims, 11 Drawing Sheets

Related U.S. Application Data

(60) Provisional application No. 63/028,768, filed on May 22, 2020.

(51) Int. Cl.
  *H01J 49/06* (2006.01)
  *H01J 49/16* (2006.01)

(58) Field of Classification Search
  USPC .................................................. 250/281, 282
  See application file for complete search history.

(56) References Cited

U.S. PATENT DOCUMENTS

| | | | |
|---|---|---|---|
| 6,794,641 B2 | 9/2004 | Bateman et al. | |
| 6,800,846 B2 | 10/2004 | Bateman et al. | |
| 6,812,453 B2 | 11/2004 | Bateman et al. | |
| 6,872,939 B2 | 3/2005 | Bateman et al. | |
| 6,884,995 B2 | 4/2005 | Bateman et al. | |
| 6,891,157 B2 | 5/2005 | Bateman et al. | |
| 6,914,241 B2 | 7/2005 | Giles et al. | |
| 7,071,467 B2 | 7/2006 | Bateman | |
| 7,095,013 B2 | 8/2006 | Bateman et al. | |
| 7,154,088 B1 | 12/2006 | Blain et al. | |
| 7,157,698 B2 | 1/2007 | Makarov et al. | |
| 7,205,538 B2 | 4/2007 | Bateman et al. | |
| 7,342,224 B2 | 3/2008 | Makarov et al. | |
| 7,405,401 B2 | 7/2008 | Hoyes | |
| 7,456,394 B2 | 11/2008 | Cameron et al. | |
| 7,491,930 B2 | 2/2009 | Shvartsburg et al. | |
| 7,507,953 B2 | 3/2009 | Makarov et al. | |
| 7,714,278 B2 | 5/2010 | Boyle et al. | |
| 7,829,841 B2 | 11/2010 | Bateman et al. | |
| 7,838,826 B1 | 11/2010 | Park | |
| 7,888,635 B2 | 2/2011 | Belov et al. | |
| 7,960,694 B2 | 6/2011 | Hoyes | |
| 8,288,717 B2 | 10/2012 | Park | |
| 8,319,177 B2 | 11/2012 | Boyle et al. | |
| 8,389,933 B2 | 3/2013 | Hoyes | |
| 8,487,240 B2 | 7/2013 | Koehl | |
| 8,581,177 B2 | 11/2013 | Kovtoun | |
| 8,742,339 B2 | 6/2014 | Hoyes | |
| 8,809,769 B2 | 8/2014 | Park | |
| 8,829,464 B2 | 9/2014 | Hoyes et al. | |
| 8,835,839 B1 | 9/2014 | Anderson et al. | |
| 8,901,490 B1 | 12/2014 | Chen et al. | |
| 8,907,273 B1 | 12/2014 | Chen et al. | |
| 8,921,772 B2 | 12/2014 | Verenchikov | |
| 8,941,054 B2 | 1/2015 | Park et al. | |
| 8,941,055 B2 | 1/2015 | Park et al. | |
| 8,946,626 B2 | 2/2015 | Giles et al. | |
| 8,969,800 B1 | 3/2015 | Tolmachev et al. | |
| 9,063,086 B1 | 6/2015 | Garimella et al. | |
| 9,082,604 B2 | 7/2015 | Verenchikov | |
| 9,123,516 B2 | 9/2015 | Hasegawa et al. | |
| 9,123,518 B2 | 9/2015 | Giles et al. | |
| 9,281,170 B2 | 3/2016 | Park et al. | |
| 9,281,172 B2 | 3/2016 | Bateman et al. | |
| 9,417,211 B2 | 8/2016 | Verenchikov | |
| 9,425,035 B2 | 8/2016 | Giles et al. | |
| 9,429,543 B2 | 8/2016 | Jiang et al. | |
| 9,455,132 B2 | 9/2016 | Mordehai et al. | |
| 9,683,964 B2 | 6/2017 | Park et al. | |
| 9,704,701 B2 | 7/2017 | Ibrahim et al. | |
| 9,741,552 B2 | 8/2017 | Park et al. | |
| 9,812,311 B2 | 11/2017 | Anderson et al. | |
| 9,865,442 B2 | 1/2018 | Giles et al. | |
| 9,880,129 B2 | 1/2018 | Bateman | |
| 9,887,074 B2 | 2/2018 | Belov | |
| 9,939,408 B2 | 4/2018 | Giles et al. | |
| 9,939,409 B2 | 4/2018 | Ibrahim et al. | |
| 9,966,244 B2 | 5/2018 | Anderson et al. | |
| 9,972,480 B2* | 5/2018 | Ristroph | H01J 49/063 |
| 10,018,592 B2 | 7/2018 | Ibrahim et al. | |
| 10,032,617 B2 | 7/2018 | Welkie | |
| 10,060,879 B2 | 8/2018 | Silveira | |
| 10,224,194 B2 | 3/2019 | Ibrahim et al. | |
| 10,224,196 B2 | 3/2019 | Giles et al. | |
| 10,241,079 B2 | 3/2019 | Betz et al. | |
| 10,317,362 B2 | 6/2019 | Harder et al. | |
| 10,317,364 B2 | 6/2019 | Garimella et al. | |
| 10,319,575 B2 | 6/2019 | Brown et al. | |
| 10,332,723 B1 | 6/2019 | Ibrahim et al. | |
| 10,408,792 B2 | 9/2019 | Betz et al. | |
| 10,424,474 B2 | 9/2019 | Ibrahim et al. | |
| 10,446,381 B2 | 10/2019 | Giles et al. | |
| 10,460,920 B1 | 10/2019 | Smith | |
| 10,466,202 B2 | 11/2019 | Ibrahim et al. | |
| 10,473,620 B2 | 11/2019 | Harder et al. | |
| 10,497,552 B2 | 12/2019 | Ibrahim et al. | |
| 10,522,337 B2 | 12/2019 | Rizzo et al. | |
| 10,665,443 B2 | 5/2020 | Ibrahim et al. | |
| 10,692,710 B2 | 6/2020 | Prabhakaran et al. | |
| 10,720,315 B2 | 7/2020 | Taghioskoui | |
| 10,741,375 B2 | 8/2020 | Hamid et al. | |
| 10,804,089 B2 | 10/2020 | Ibrahim et al. | |
| 10,811,244 B2 | 10/2020 | Green et al. | |
| 10,840,077 B2 | 11/2020 | Taghioskoui | |
| 10,861,687 B2 | 12/2020 | Wildgoose et al. | |
| 10,976,283 B2 | 4/2021 | Ibrahim et al. | |
| 11,209,393 B2 | 12/2021 | Garimella et al. | |
| 11,293,898 B2 | 4/2022 | Prasad et al. | |
| 11,322,340 B2 | 5/2022 | Hamid et al. | |
| 11,460,439 B2 | 10/2022 | DeBord et al. | |
| 11,543,384 B2 | 1/2023 | DeBord et al. | |
| 11,605,531 B2 | 3/2023 | Ibrahim et al. | |
| 11,662,333 B2 | 5/2023 | DeBord et al. | |
| 11,670,495 B2 | 6/2023 | DeBord et al. | |
| 11,761,925 B2 | 9/2023 | Garimella et al. | |
| 11,874,252 B2 | 1/2024 | DeBord et al. | |
| 11,953,466 B2 | 4/2024 | DeBord et al. | |
| 2005/0127290 A1 | 6/2005 | Hashimoto et al. | |
| 2016/0071715 A1 | 3/2016 | Anderson et al. | |
| 2017/0350860 A1 | 12/2017 | Rather et al. | |
| 2019/0004011 A1 | 1/2019 | Garimella et al. | |
| 2019/0103261 A1* | 4/2019 | Ibrahim | H01J 49/062 |
| 2019/0348268 A1* | 11/2019 | Hamid | H01J 49/062 |
| 2019/0369049 A1 | 12/2019 | Ridgeway | |
| 2019/0369050 A1 | 12/2019 | Garimella et al. | |
| 2020/0161119 A1 | 5/2020 | Richardson et al. | |
| 2020/0200708 A1 | 6/2020 | Ibrahim et al. | |
| 2020/0321190 A1 | 10/2020 | Ibrahim et al. | |
| 2020/0321208 A1 | 10/2020 | Cooks et al. | |
| 2020/0326304 A1 | 10/2020 | Giles et al. | |
| 2020/0373139 A1 | 11/2020 | DeBord et al. | |
| 2020/0378922 A1 | 12/2020 | Ibrahim et al. | |
| 2020/0381241 A1 | 12/2020 | Park et al. | |
| 2020/0395202 A1 | 12/2020 | Richardson et al. | |
| 2021/0080429 A1 | 3/2021 | DeBord et al. | |
| 2021/0310989 A1 | 10/2021 | DeBord et al. | |
| 2021/0382006 A1 | 12/2021 | DeBord et al. | |
| 2022/0074891 A1 | 3/2022 | DeBord et al. | |
| 2022/0136999 A1* | 5/2022 | Garimella | H01J 49/0027 250/282 |
| 2022/0365027 A1 | 11/2022 | Makarov | |
| 2023/0103674 A1 | 4/2023 | DeBord et al. | |
| 2023/0187194 A1 | 6/2023 | Deng et al. | |
| 2023/0268169 A1 | 8/2023 | DeBord et al. | |
| 2024/0003847 A1 | 1/2024 | Garimella et al. | |
| 2024/0110891 A1 | 4/2024 | DeBord et al. | |
| 2024/0170274 A1 | 5/2024 | McCabe et al. | |
| 2024/0248062 A1 | 7/2024 | DeBord et al. | |

FOREIGN PATENT DOCUMENTS

| | | |
|---|---|---|
| JP | 2005-183022 A | 7/2005 |
| JP | 2016-009562 A | 1/2016 |
| JP | 2016522401 A | 7/2016 |
| JP | 2016-526168 A | 9/2016 |
| WO | 2020/201732 A1 | 10/2020 |
| WO | 2020/240197 A1 | 12/2020 |

(56) References Cited

FOREIGN PATENT DOCUMENTS

| | | |
|---|---|---|
| WO | 2020/243194 A1 | 12/2020 |
| WO | 2021/237101 A1 | 11/2021 |

OTHER PUBLICATIONS

European Search Report dated Jun. 11, 2024, and issued in connection with European Patent Application No. 21807879.8 (7 pages).
Office Action mailed Jan. 9, 2024, in connection with Japanese Application No. 2022-571134, along with English translation thereof (12 pages).
Office Action mailed Jul. 30, 2024, in connection with Japanese Patent Application No. 2022-571134, along with English translation thereof (4 pages).
Donohoe, et al., "A New Ion Mobility-Linear Ion Trap Instrument for Complex Mixture Analysis," Anal. Chem., vol. 86, Iss. 16, pp. 8121-8128, Aug. 19, 2014 (17 pages).
F. W. Schmidlin, "A New Nonlevitated Mode of Traveling Wave Toner Transport," IEEE, Copyright 1988 (5 pages).
G. Bollen, "'Ion Surfing' with Radiofrequency Carpets," Int'l Journal of Mass Spec., vol. 299, pp. 131-138, Jan. 2011 (8 pages).
Hamid et al., "Characterization of Traveling Wave Ion Mobility Separations in Structures for Lossless Ion Manipulations," Anal. Chem., 2015, 87, pp. 11301-11308, published Oct. 28, 2015 (8 pages).
Henderson et al., "ESI/Ion Trap/Ion Mobility/Time-of-Flight Mass Spectrometry for Rapid and Sensitive Analysis of Biomolecular Mixtures," Anal. Chem., vol. 71, Iss. 2, pp. 291-301, Jan. 15, 1999 (Abstract only—1 page).
Hoaglund-Hyzer et al., "Ion Trap/Ion Mobility/Quadrupole/Time-of-Flight Mass Spectrometry for Peptide Mixture Analysis," Anal. Chem., vol. 73, Iss. 2, pp. 177-184, Jan. 15, 2001 (Abstract only—1 page).
Ibrahim et al., "Development of a New Ion Mobility (Quadrupole) Time-of-Flight Mass Spectrometer," Int'l Journal of Mass Spectrometry, 377 (2015) 655-662, Jul. 28, 2014 (8 pages).
Jiang et al., "Ion Mobility—Mass Spectrometry," Encyclopedia of Anal. Chem., 2013, DOI: 10.1002/9780470027318.a9292 (21 pages).
Li et al., "Ion Mobility Spectrometry with High Ion Utilization Efficiency Using Traveling Wave-Based Structures for Lossless Ion Manipulations (SLIM)," poster presented at the Proceedings of the 68th ASMS Conference on Mass Spectrometry and Allied Topics, Online Meeting, Jun. 1-12, 2020 (1 page).
Li et al., "Ion Mobility Spectrometry with High Ion Utilization Efficiency Using Traveling Wave-Based Structures for Lossless Ion Manipulations," Anal. Chem., vol. 92, Iss. 22, p. 14930-14938, Oct. 26, 2020 (9 pages).
Masuda et al., "Movement of Blood Cells in Liquid by Nonuniform Traveling Field," IEEE Transactions on Industry Applications, vol. 24, No. 2, pp. 217-222, Mar./Apr. 1988 (6 pages).
Notice of Allowance mailed Dec. 7, 2023, in connection with U.S. Appl. No. 17/327,159 (2 pages).
Notice of Allowance mailed Feb. 13, 2024, in connection with U.S. Appl. No. 17/327,159 (9 pages).
Notice of Allowance mailed Nov. 24, 2023, in connection with U.S. Appl. No. 17/327,159 (9 pages).
Office Action mailed Jul. 27, 2023, in connection with U.S. Appl. No. 17/327,159 (12 pages).
Office Action mailed Mar. 16, 2023, in connection with U.S. Appl. No. 17/327,159 (12 pages).
PCT International Search Report and Written Opinion dated Aug. 31, 2021, for Int'l App. No. PCT/US2021/033670 (11 pages).
Wu et al., "Separation of Isomeric Peptides Using Electrospray Ionization/High-Resolution Ion Mobility Spectrometry," Anal. Chem., vol. 72, Iss. 2, pp. 391-395, Jan. 15, 2000 (Abstract only—1 page).
Zhang et al., "Ion Trapping, Storage, and Ejection in Structures for Lossless Ion Manipulations," Anal. Chem. 2015, 87, 6010-6016, May 14, 2015 (7 pages).
U.S. Appl. No. 17/327,159, US, filed May 21, 2021, U.S. Pat. No. 11,953,466.
U.S. Appl. No. 63/028,768, US, filed May 22, 2020.
PCT/US21/33670, PCT, May 21, 2021, WO 2021/237101.
3,178,943, CA, May 21, 2021, CA 3178943.
2021276671, AU, May 21, 2021, AU 2021276671.
2022-571134, JP, May 21, 2021, JP 2023-527776.
202180044343.6, CN, May 21, 2021, CN 115885176.
21807879.8, EP, May 21, 2021, EP 4153985.
11202260393U, GB, May 21, 2021, SG 11202260393U.

\* cited by examiner

METHODS AND APPARATUS FOR TRAPPING AND ACCUMULATION OF IONS

CROSS-REFERENCE TO RELATED APPLICATIONS

This application is a continuation application of, and claims the benefit of priority to, U.S. patent application Ser. No. 17/327,159, filed on May 21, 2021, which claims the benefit of priority to U.S. Provisional Patent Application No. 63/028,768, filed on May 22, 2020, the entire contents of each of these applications are hereby incorporated by reference in their entirety.

TECHNICAL FIELD

The present disclosure relates generally to the fields of ion mobility spectrometry (IMS) and mass spectrometry (MS). More specifically, the present disclosure relates to methods and apparatus for trapping and accumulation of ions to increase the resolution of ions in IMS and MS systems.

RELATED ART

IMS is a technique for separating and identifying ions in the gaseous phase based on their mobilities. For example, IMS can be employed to separate structural isomers and macromolecules that have different mobilities. IMS relies on applying a constant or a time-varying electric field to a mixture of ions within a static or dynamic background gas. An ion having a larger mobility (or smaller collision cross section [CCS]) moves faster under the influence of the electric field compared to an ion with a smaller mobility (or larger CCS). By applying the electric field over a separation distance (e.g., in a drift tube) of an IMS device, ions from an ion mixture can be temporally or spatially separated based on their mobility. Because ions with different mobilities arrive at the end of the drift tube at different times (temporal separation) they can be identified based on the time of detection by a detector at the end of the drift tube. Resolution of the mobility separation can be varied by changing the separation distance.

MS is an analytical technique that can separate a mixture of chemical species based on their mass-to-charge ratio. MS involves ionizing the mixture of chemical species followed by acceleration of the ion mixture in the presence of electric and/or magnetic fields. In some mass spectrometers, ions having the same mass-to-charge ratio undergo the same deflection or time dependent response. Ions with different mass-to-charge ratios can undergo different deflections or time dependent response, and can be identified based on the spatial or temporal position of detection by a detector (e.g., electron multiplier).

IMS combined with MS can generate an IMS-MS spectrum that can be used in a broad range of applications, including metabolomics, glycomics, and proteomics. IMS-MS ion separation can be performed by coupling an ion mobility spectrometer with a mass spectrometer. For example, an ion mobility spectrometer can first separate the ions based on their mobility. Ions having different mobilities can arrive at the mass spectrometer at different times, and are then separated based on their mass-to-charge ratio. One example of an IM spectrometer is a structure for lossless ion manipulations (SLIM) device that can generate an IMS spectrum with minimal ion loss. SLIM devices can use traveling wave separation as one technique to separate ions of different mobilities. However, traveling wave separation can result in broad peaks for ion mobility separations, particularly when the traveling wave separation is performed over a long distance.

Moreover, the signal-to-noise ratio and resolution at the time of detection are impacted by the number of ions introduced into an IMS device. Accordingly, ion traps have been used to accumulate ions prior to injecting the ions for ion mobility separation, however, such ion traps are limited by space charge effects. In this regard, ion traps can accumulate a limited number of charges before reaching space-charge capacity, at which point ions can be lost from the trap. In the past, these limitations have generally been addressed by increasing the path length, which can result in a larger and/or more complex device. Additionally, systems and methods have been developed that impose an intermittent or "stuttering" traveling wave to sort, compress, or regroup ions into a reduced number of ion mobility bins, which results in ion spatial compression and increased resolution of ion packets in IMS. For example, U.S. Pat. No. 10,018,592 entitled Method and Apparatus for Spatial Compression and Increased Mobility Resolution of Ions, discloses varying a duty cycle of an intermittent traveling wave to compress ion packets into narrower distribution peaks. However, the foregoing methodology is still limited by the space charge effect and the parameters (e.g., speed, amplitude, waveform, etc.) of the traveling waves utilized.

Accordingly, there is a need for additional systems and methods for on-board trapping and accumulation of ions to increase the resolution and sensitivity in IMS and MS systems.

SUMMARY

The present disclosure relates to methods and apparatus for on-board trapping and accumulation of ions to increase the resolution of ions in IMS and MS systems.

In accordance with embodiments of the present disclosure, exemplary apparatus for ion accumulation are provided. An apparatus for ion accumulation includes a first region and a second region. The first region is configured to receive ions and generate a first drive potential configured to guide the ions across the first region in a first direction. The second region is configured to receive the ions from the first region, switch between a first state, which can be a trap state, and a second state, which can be a release state, generate a first electric field when in the first state, and generate a second electric field when in the second state. The first electric field is configured to prevent the ions from moving in the first direction and entering the third region, and the second electric field is configured to guide the ions in the first direction toward a third region. Accordingly, the first electric field can be generated during the trap state, and the second electric field can be generated during the release state. When the second region is in the first state, the first drive potential and the first electric field prevent ions in the second region from exiting the second region and cause the ions to accumulate in the second region. When the second region is in the second state, the second electric field causes the ions to move in the first direction toward the third region.

In one aspect, the first drive potential can be a traveling wave. In another aspect, the first electric field can be a DC voltage. In such aspects, the magnitude of the DC voltage can be greater than a voltage bias of the first drive potential. Additionally in such aspects, the second electric field can be a traveling wave, and the traveling wave can be configured to separate the ions based on mobility. In other aspects, a magnitude of the DC voltage can be less than a voltage bias of the first drive potential, and the DC voltage can create a potential well. In such aspects, the second electric field can be a DC potential gradient or a traveling wave that can be configured to separate the ions based on mobility.

In some aspects, the first electric field can be a traveling wave that travels in a second direction that is opposite to the first direction, and the second electric field can be a second traveling wave that travels in the first direction. In such aspects, the second traveling wave can be configured to separate the ions based on mobility. Additionally, in such aspects, the first electric field can be generated during a trap state, and the second electric field can be generated during a release state.

In other aspects, the third region can be configured to receive the ions from the second region and generate a second drive potential configured to separate the ions based on mobility.

In still other aspects, the first region can include a plurality of electrodes disposed on a first surface, arranged along the first direction, and configured to generate the first drive potential, the second region can include one or more electrodes disposed on the first surface and arranged along the first direction, and at least one of the one or more electrodes of the second region can be configured to generate the first electric field when in the first state and generate the second electric field when in the second state.

In such aspects, the apparatus can include a controller that is configured to apply a first voltage signal to the plurality of electrodes of the first region, apply a second voltage signal to at least one electrode of the one or more electrodes of the second region, and apply a third voltage signal to the at least one electrode of the one or more electrodes of the second region. Additionally, the plurality of electrodes can be configured to generate the first drive potential based on the first voltage signal, the at least one electrode can be configured to generate the first electric field based on the second voltage signal, and the at least one electrode can be configured to generate the second electric field based on the third voltage signal. When the apparatus is in a first mode of operation the controller applies the second voltage signal to the second plurality of electrodes placing the second region in the first state, and when the apparatus is in a second mode of operation the controller applies the third voltage signal to the second plurality of electrodes placing the second region in the second state.

In some aspects, a first portion of the second region can generate the first electric field when the second region is in the first state, the first portion of the second region can generate the second electric field when the second region is in the second state, and a second portion of the second region can generate a fourth electric field that is different than the first electric field.

In some other aspects, the second region can include a plurality of rows of radio frequency (RF) electrodes and a plurality of traveling wave (TW) electrode arrays, and each of the plurality of TW electrode arrays can include at least three individual electrodes. In such aspects, the first electric field can be generated by at least one of the individual electrodes of each of the plurality of TW electrode arrays when the second region is in the first state.

A method for ion accumulation involves introducing ions into an apparatus for ion accumulation having a first region, a second region, and a third region. The method includes generating a drive potential within the first region for guiding the ions across the first region in a first direction, and transferring the ions from the first region to the second region with the drive potential. The method also includes generating a first electric field within the second region for preventing the ions from moving in the first direction and entering the third region, and accumulating ions in the second region. The first electric field can be applied during a trap state. The method further includes switching the first electric field generated within the second region to a second electric field for guiding the accumulated ions in the first direction toward the third region. The second electric field can be generated during a release state.

In some aspects, the drive potential can be a traveling wave. In other aspects, the first electric field can be a DC voltage. In such aspects, a magnitude of the DC voltage can be greater than a voltage bias of the drive potential. In other such aspects, the second electric field can be a traveling wave, and the method can involve separating the ions based on mobility with the traveling wave.

In other aspects, a magnitude of the DC voltage can be less than a voltage bias of the first drive potential, and the DC voltage can create a potential well. In such aspects, the second electric field can be a DC potential gradient or a traveling wave. Where the second electric field is a traveling wave, the method can further involve separating the ions based on mobility with the traveling wave.

In still other aspects, the first electric field can be a first traveling wave that travels in a second direction that is opposite to the first direction, and the second electric field can be a second traveling wave that travels in the first direction. In such aspects, the method can further involve separating the ions based on mobility with the traveling wave. Additionally, in such aspects, the first electric field can be generated during a trap state, and the second electric field can be generated during a release state.

In one aspect, the method can also involve transferring the ions accumulated in the second region to the third region, generated a second drive potential within the third region, and separating the ions based on mobility with the second drive potential.

In some aspects, a first portion of the second region can generate the first electric field and the second electric field, and a second portion of the second region can generate a fourth electric field that is different than the first electric field.

In some other aspects, the second region can include a plurality of rows of radio frequency (RF) electrodes and a plurality of traveling wave (TW) electrode arrays, and each of the plurality of TW electrode arrays can include at least three individual electrodes. In such aspects, the first electric field can be generated by at least one of the individual electrodes of each of the plurality of TW electrode arrays when the second region is in the first state.

In another aspect, an apparatus for ion accumulation includes an ion channel, a first region, a second region, a third region, and a controller. The ion channel is defined between a first surface and a second surface, extends along a first longitudinal direction and a first lateral direction, and is configured to receive a stream of ions. The first region includes a plurality of electrodes disposed on the first surface and arranged along the first longitudinal direction. The second region includes one or more electrodes disposed on the first surface and arranged along the first longitudinal direction. The controller is configured to apply a first voltage signal to the plurality of electrodes of the first region, apply a second voltage signal to the one or more electrodes of the second region, and apply a third voltage signal to the one or more electrodes of the second region. The second voltage signal can be applied during a trapping mode of operation, and the third voltage signal can be applied during a release mode of operation. The plurality of electrodes of the first region are configured to generate, based on the first voltage signal, a first drive potential that travels along the first longitudinal direction. The first drive potential is configured to guide the ions across the ion channel in the first longitudinal direction. The one or more electrodes of the second region are configured to generate, based on the second voltage signal, a first electric field that prevents the ions from traveling along the first longitudinal direction and into the third region. The first electric field can be generated during the trapping mode of operation. The one or more electrodes of the second region are configured to generate, based on the third voltage signal, a second electric field configured to guide the ions along the first longitudinal direction toward the third region. The third voltage signal can be generated during the release mode of operation. When the apparatus is in a first mode of operation, which can be the trapping mode of operation, the controller applies the second voltage signal to the one or more electrodes of the second region, and the first drive potential and the first electric field prevent ions in the second region from exiting the second region, which causes the ions to accumulate in the second region. When the apparatus is in a second mode of operation, which can be the release mode of operation, the controller applies the third voltage signal to the one or more electrodes of the second region, and the second electric field causes the ions to move in the first direction toward the third region.

In some aspects, the first voltage signal can be a traveling wave. In other aspects, the second voltage signal can be a DC voltage. In such aspects, a magnitude of the DC voltage can be greater than a voltage bias of the first drive potential. Also, in such aspects, the third voltage signal can be a traveling wave, and the traveling wave can be configured to separate the ions based on mobility.

In other aspects, the second voltage signal can be applied to a single electrode of the second region.

In still other aspects, a magnitude of the DC voltage can be less than a voltage bias of the first drive potential, and the DC voltage can create a potential well. In such aspects, the third voltage signal can be a DC potential gradient or a traveling wave that can be configured to separate the ions based on mobility. In such aspects, the DC voltage can be applied to two or more electrodes of the second region.

In one aspect, the second voltage signal can be a traveling wave that travels in a second direction that is opposite to the first direction, and the third voltage signal can be a second traveling wave that travels in the first direction. In such an aspect, the second traveling wave can be configured to separate the ions based on mobility. Additionally, in such aspects, the second voltage signal can be applied during a trapping mode of operation, and the third voltage signal can be applied during a release mode of operation.

In another aspect, the third region can include a plurality of electrodes disposed on the first surface and arranged along the first longitudinal direction. The third region can be configured to receive the ions from the second region and generate a second drive potential configured to separate the ions based on mobility.

A method of ion accumulation involves introducing a stream of ions into an ion channel of an ion accumulation device. The accumulation device includes a first surface, a second surface, a first region including a plurality of electrodes disposed on the first surface and arranged along the first longitudinal direction, a second region including one or more electrodes disposed on the first surface and arranged along the first longitudinal direction, and a third region. The first ion channel is defined between the first surface and the second surface, and extends along a first longitudinal direction and a first lateral direction. The method also includes applying, by a controller, a first voltage signal to the plurality of electrodes of the first region, and generating, by the plurality of electrodes of the first region, a first drive potential that travels along the first longitudinal direction. The first drive potential is also configured to guide the ions within the ion channel in the first longitudinal direction. The method also includes transferring, with the first drive potential, the ions within the ion channel from the first region to the second region along the first longitudinal direction. The method further includes applying, by the controller, a second voltage signal to the one or more electrodes of the second region, and generating, by the one or more electrodes of the second region, a first electric field based on the second voltage signal. The second voltage signal can be applied, and the first electric field can be generated, during a trapping mode of operation. The method also includes preventing, with the first electric field, the ions from moving in the first direction and entering the third region, and accumulating ions in the second region. The method further includes switching the second voltage signal applied to the second region by the controller to a third voltage signal for guiding the ions accumulated in the second region within the ion channel in the first direction toward the third region. The third voltage signal can be applied, and the second electric field can be generated, during a release mode of operation.

In some aspects, the first voltage signal can be a traveling wave. In other aspects, the second voltage signal can be a DC voltage. In such aspects, a magnitude of the DC voltage can be greater than a voltage bias of the first voltage signal. In other such aspects, the third voltage signal can be a traveling wave, and the method can involve separating the ions based on mobility with the traveling wave. In still other such aspects, the second voltage signal can be applied to a single electrode of the second region.

In other aspects, a magnitude of the DC voltage can be less than a voltage bias of the first voltage signal, and the DC voltage can create a potential well. In such aspects, the third voltage signal can be a DC potential gradient or a traveling wave. Where the third voltage signal is a traveling wave, the method can further involve separating the ions based on mobility with the traveling wave. In such aspects, the DC voltage can be applied to two or more electrodes of the second region.

In still other aspects, the second voltage signal can be a traveling wave that travels in a second direction that is opposite to the first direction, and the third voltage signal can be a second traveling wave that travels in the first direction. In such aspects, the method can further involve separating the ions based on mobility with the traveling wave. Additionally, in such aspects, the second voltage signal can be applied during a trapping mode of operation, and the third voltage signal can be applied during a release mode of operation.

In one aspect, the method can also involve transferring the ions accumulated in the second region to the third region. This method can also involve applying, by the controller, a fourth voltage signal to a plurality of electrodes of the third region, which can be disposed on the first surface and arranged along the first longitudinal direction. This method can further involve generating, by the plurality of electrodes of the third region, a second drive potential that travels along the first longitudinal direction. The second drive potential can be configured to guide the ions within the ion channel in the first longitudinal direction. This method can also involve separating the ions based on mobility with the second drive potential. In some aspects, the fourth voltage signal and the third voltage signal can be the same. In other aspects, the first voltage signal, the third voltage signal, and the fourth voltage signal can be the same.

An ion accumulation device includes an ion accumulation section, an outlet section, and an outlet transition section. The ion accumulation section has a first width and is configured to receive ions, switch between a first state and a second state, generate a first electric field when in the first state, and generate a second electric field when in the second state. The outlet section has a second width that is less than the first width and is configured to generate a third electric field that is configured to guide the ions across the outlet section. The outlet transition section extends between the ion accumulation section and the outlet section and has a tapering width that reduces from the first width adjacent the ion accumulation section to the second width adjacent the outlet section. The outlet transition section is also configured to generate the third electric field to guide the ions across the outlet transition section to the outlet section. The first electric field is configured to prevent the ions from moving in a first direction and entering the outlet transition section, while the second electric field is configured to guide the ions in the first direction toward the outlet transition section. When the ion accumulation section is in the first state the first electric field prevents ions in the ion accumulation section from exiting the ion accumulation section and causes the ions to accumulate in the ion accumulation section. When the ion accumulation section is in the second state the second electric field causes the ions to move in the first direction toward the outlet transition section.

In some aspects, the outlet transition section can be configured to prevent ions from being discharged due to space charge effects. In some other aspects, the third electric field can be the same as the second electric field, or can be different than the second electric field.

In still other aspects, the ion accumulation device can also include an inlet section and an inlet transition section. The inlet section can have a third width that is less than the first width, and the inlet transition section can extend between the inlet section and the ion accumulation section. The inlet transition section can have a tapering width that increases from the third width adjacent the inlet section to the first width adjacent the ion accumulation section. In such aspects, the inlet section and the outlet transition section can be configured to generate a fourth electric field to guide the ions across the inlet section and the inlet transition section to the ion accumulation section.

In some other aspects, the second electric field can be a traveling wave that travels in the first direction, and the ion accumulation section can be configured to be switched from generating the second electric field to generating a fourth electric field that is a traveling wave that travels in a second direction opposite the first direction.

In other aspects, the first electric field can be a DC voltage. In such aspects, a first portion of the ion accumulation section can generate the first electric field and a second portion of the ion accumulation section can generate a fourth electric field that is different than the first electric field.

In still other aspects, the ion accumulation section can include a plurality of rows of radio frequency (RF) electrodes and a plurality of traveling wave (TW) electrode arrays where each of the plurality of TW electrode arrays includes at least three individual electrodes. In such aspects, the first electric field can be generated by at least one of the individual electrodes of each of the plurality of TW electrode arrays.

In other aspects, the ion accumulation device can include an inlet section that is positioned at a lateral side of the ion accumulation section and configured to provide ions to the ion accumulation section.

Other features will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

The foregoing features of the present disclosure will be apparent from the following Detailed Description of the Invention, taken in connection with the accompanying drawings, in which.

DETAILED DESCRIPTION

The present disclosure relates to methods and apparatus for on-board trapping and accumulation of ions, as described in detail below in connection with FIGS. 1-11.

Ions can be separated based on their mobility via ion mobility spectrometry (IMS). Mobility separation can be achieved, for example, by applying one or more potential waveforms (e.g., traveling potential waveforms, direct current (DC) gradient, or both) on a collection of ions. IMS based mobility separation can be achieved by structures for lossless ion manipulation (SLIM) that can systematically apply traveling and/or DC potential waveforms to a collection of ions, such as the devices disclosed and described in U.S. Pat. No. 8,835,839 entitled "Method and Apparatus for Ion Mobility Separations Utilizing Alternating Current Waveforms" and U.S. Pat. No. 10,317,364 entitled "Ion Manipulation Device," both of which are incorporated herein in their entirety. This can result in a continuous stream of ions that are temporally/spatially separated based on their mobility. In some implementations, it can be desirable to select ions having a predetermined mobility range from a collection of ions. This can be achieved by mobility-based filtering of ions in SLIM devices ("SLIM filters"). SLIM filters (e.g., low pass filters, high pass filters, band pass filters, etc.) can apply a superposition to multiple potential waveforms that are directed (e.g., traveling) in different directions (e.g., in two-dimensions). Properties of the potential waveforms (e.g., amplitude, shape, frequency, etc.) can determine the properties of the SLIM filter (e.g., bandwidth, cut-off mobility values, etc.).

The present disclosure utilizes the aforementioned SLIM devices to not only transfer and separate ions of different mobilities, but to also accumulate ions within the respective SLIM device for subsequent separation and analysis. In this regard, different waveforms can be applied to different regions of the SLIM device, e.g., one or more electrodes grouped together, to trap ions in an accumulation region until the space-charge limit is reached or a sufficient number of ions are accumulated, as discussed in greater detail below.

Figure 1:
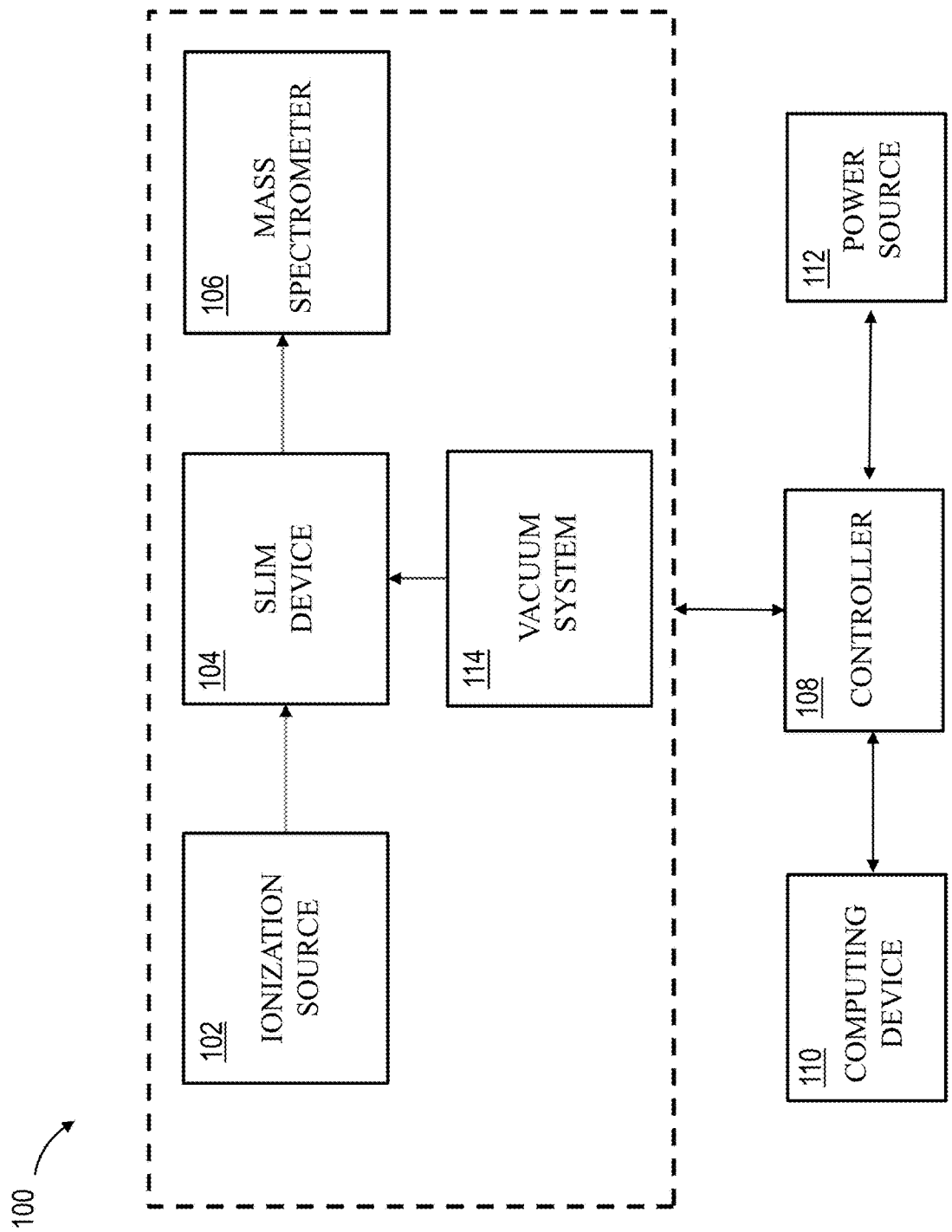
FIG. 1 is a schematic diagram of an exemplary ion mobility separation (IMS) system of the present disclosure.

FIG. 1 is a schematic diagram of an exemplary ion mobility separation (IMS) system 100 in accordance with the present disclosure. The IMS system 100 includes an ionization source 102, a SLIM device 104, a mass spectrometer 106, a controller 108, a computing device 110, a power source 112, and a vacuum system 114. The ionization source 102 generates ions (e.g., ions having varying mobility and mass-to-charge-ratios) and injects the ions into the SLIM device 104 (discussed in greater detail in connection with FIGS. 2-4). The SLIM device 104 can be configured to transfer ions, accumulate ions, store ions, and/or separate ions, depending on the desired functionality and waveforms applied thereto. In this regard, the SLIM device 104 can be used to select ions with one or more predetermined ranges of mobility and direct the selected band (or bands) of ions to a detector, e.g., the mass spectrometer 106. The vacuum system 114 can be in fluidic communication with the SLIM device 104 and regulate the gas pressure within the SLIM device 104. Specifically, the vacuum system 114 can provide nitrogen to the SLIM device 104 while maintaining the pressure therein at a consistent pressure.

The SLIM device 104 can include one or more surfaces 114a, 114b (e.g., printed circuit board surfaces) that can have a plurality of electrodes arranged thereon. The electrodes can receive voltage signals, a voltage waveform, and/or a current waveform (e.g., a DC voltage or current, an RF voltage or current, or an AC voltage or current, or a superposition thereof), and can generate a potential (e.g., a potential gradient) to confine ions in the SLIM device 104, accumulate ions in the SLIM device 104, and guide ions through the SLIM device 104, which can result in the accumulation and separation of ions based on their mobility, as discussed in greater detail below.

The controller 108 can control operation of the ionization source 102, the SLIM device 104, the mass spectrometer 106, and the vacuum system 114. For example, the controller 108 can control the rate of injection of ions into the SLIM device 104 by the ionization source 102, the threshold mobility of the SLIM device 104, and ion detection by the mass spectrometer 106. The controller 108 can also control the characteristics and motion of potential waveforms generated by the SLIM device 104 (e.g., by applying RF/AC/DC potentials to the electrodes of the SLIM device 104) in order to transfer, accumulate, and/or separate ions.

The controller 108 can control the properties of the potential waveforms (e.g., amplitude, shape, frequency, etc.) by varying the properties of the applied RF/AC/DC potential (or current). In this regard, the controller 108 can vary the properties of the potential waveforms for different regions of the SLIM device 104, e.g., different groupings of electrodes, to trap/accumulate ions and subsequently separate ions. This can be done in an effort to increase ion peak resolution, narrow ion peaks, increase signal-to-noise ratio, and achieve sharp separation around a targeted mobility.

The controller 108 can receive power from the power source 112, which can be, for example, a DC power source that provides DC voltage to the controller 108. The controller 108 can include multiple power supply modules (e.g., current and/or voltage supply circuits) that generate various voltage (or current) signals that drive the electrodes of the SLIM device 104. For example, the controller 108 can include RF control circuits that generate RF voltage signals, traveling wave control circuits that generate traveling wave voltage signals, DC control circuits that generate DC voltage signals, etc. The RF voltage signals, traveling wave voltage signals, and DC voltage signals can be applied to the electrodes of the SLIM device 104. The controller 108 can also include a master control circuit that can control the operation of the RF/traveling wave/DC control circuits. For example, the master control circuit can control the amplitude and/or phase of voltage (or current) signals generated by the RF/traveling wave/DC control circuits to achieve a desirable operation of the mobility filter system 100.

As discussed above, the SLIM device 104 can generate DC/traveling potential waveforms (e.g., resulting from potentials generated by multiple electrodes in the SLIM device 104) and DC potentials, which can perform mobility-based separations and cause ion accumulation. The traveling potential waveform can travel at a predetermined velocity based on, for example, frequency of voltage signals applied to the electrodes. In some implementations, the traveling potential waveform can be spatially periodic and the spatial periodicity can depend on the phase differences between the voltage signals applied to adjacent electrode pairs. In some implementations, the phase differences can determine the direction of propagation of the potential waveform. In some implementations, the waveform applied to accumulation/trapping/gate electrodes can control accumulation of ions in the SLIM device 104. The master control circuit can control the frequency and/or phase of voltage outputs of RF/traveling wave/DC control circuits such that the traveling potential waveform has a desirable (e.g., predetermined) spatial periodicity and/or speed, and the accumulation waveforms/potentials sufficiently restrict ion motion and thus accumulate ions.

In some implementations, the controller 108 can be communicatively coupled to a computing device 110. For example, the computing device 110 can provide operating parameters of the IMS system 100 via a control signal to the master control circuit. In some implementations, a user can provide the computing device 110 (e.g., via a user interface) with the operating parameters. Based on the operating parameters received via the control signal, the master control circuit can control the operation of the RF/AC/DC control circuits which in turn can determine the operation of the coupled SLIM device 104. In some implementations, RF/AC/DC control circuits can be physically distributed over the IMS system 100. For example, one or more of the RF/AC/DC control circuits can be located in the IMS system 100, and the various RF/AC/DC control circuits can operate based on power from the power source 112.

Figure 2:
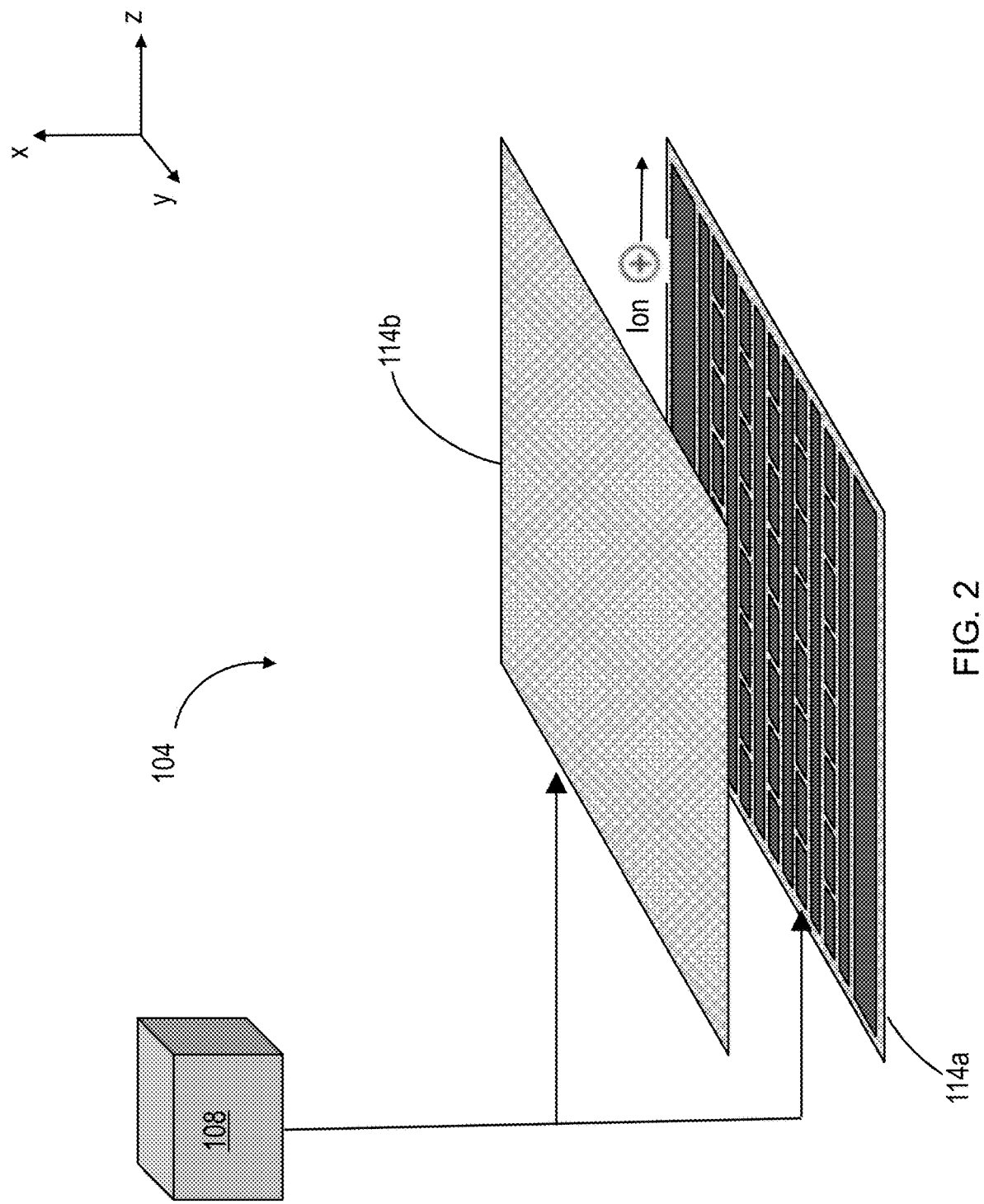
FIG. 2 is a diagrammatic view of a portion of an exemplary SLIM device that can be used with the IMS system of FIG. 1 of the present disclosure.

FIG. 2 is a diagrammatic view of a portion of an exemplary SLIM device 104 (e.g., SLIM device for transferring ions, accumulating ions, storing ions, and or separating ions) that can be used with the IMS system 100 of FIG. 1. The SLIM device 104 includes a first surface 114a and a second surface 114b. The first and second surfaces 114a, 114b can be arranged (e.g., parallel to one another) to define one or more ion channels there between. The first surface 114a and the second surface 114b can include electrodes 116, 118a-f, 120a-e, 122a-x (see FIGS. 3 and 4), e.g., arranged as arrays of electrodes on the surfaces facing the ion channel. The electrodes 116, 118a-118f, 120a-e, 122a-x on the first surface 114a and second surface 114b can be electrically coupled to the controller 108 and receive voltage (or current) signals or waveforms therefrom. In some implementations, the first surface 114a and second surface 114b can include a backplane that includes multiple conductive channels that allow for electrical connection between the controller 108 and the electrodes 116, 118a-f, 120a-e, 122a-x on the first surface 114a and second surface 114b. In some implementations, the number of conductive channels can be fewer than the number of electrodes 116, 118a-f, 120a-e, 122a-x. In other words, multiple electrodes 116, 118a-f, 120a-e, 122a-x can be connected to a single electrical channel. As a result, a given voltage (or current) signal can be transmitted to multiple electrodes 116, 118a-f, 120a-e, 122a-x simultaneously. Based on the received voltage (or current) signals, the electrodes 116, 118a-f, 120a-e, 122a-x can generate one or more potentials (e.g., a superposition of various potentials) that can confine, drive, and/or separate ions along a propagation axis (e.g., z-axis).

Figure 3:
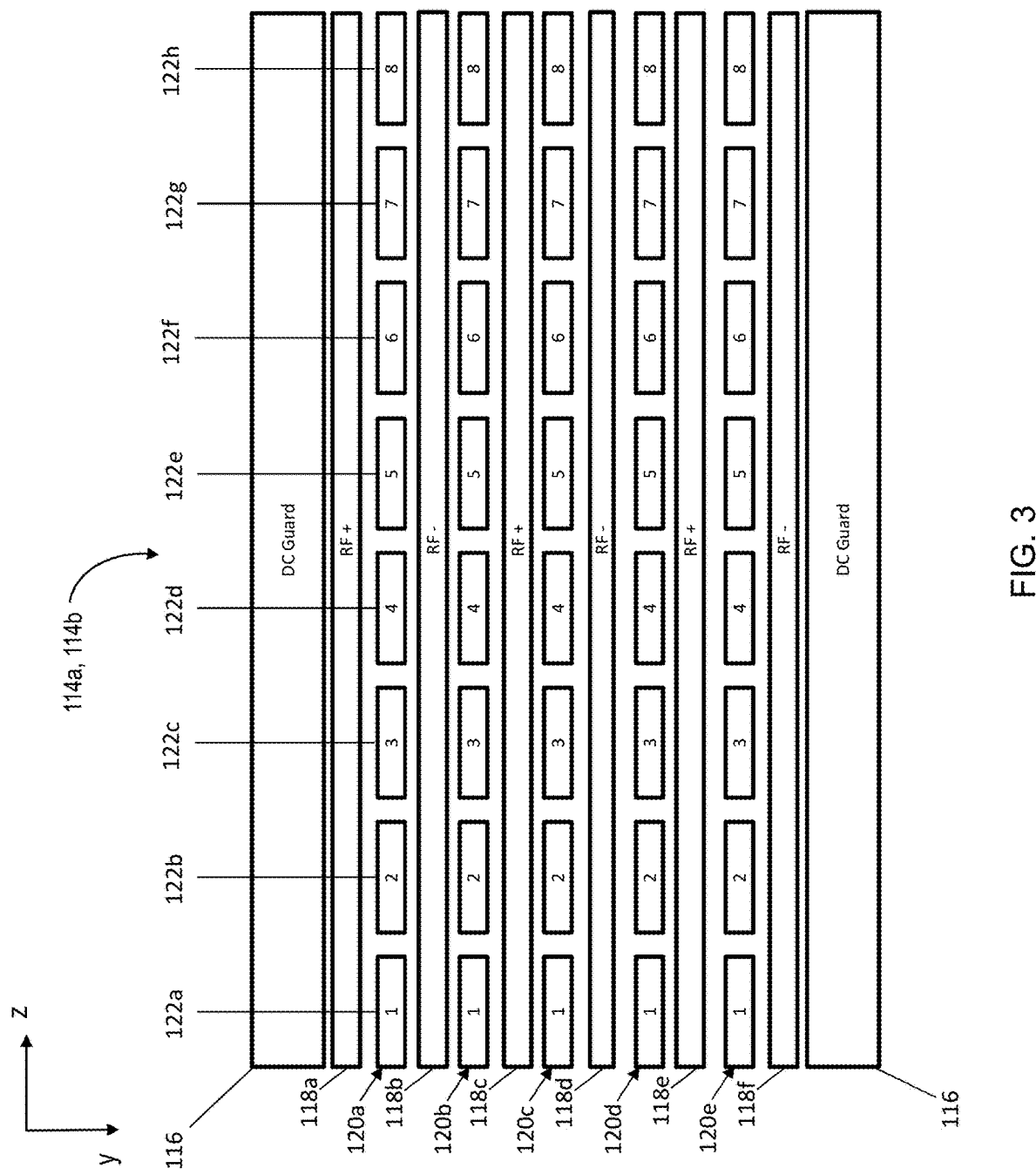
FIG. 3 is a schematic diagram illustrating a first exemplary arrangement of electrodes on a surface of the SLIM device of FIG. 2.

FIG. 3 is a schematic diagram of the first and second surfaces 114a, 114b of the SLIM device 104 illustrating a first exemplary arrangement of electrodes 116, 118a-f, 120a-e, 122a-h thereon. The first and second surfaces 114a, 114b can be substantially mirror images relative to a parallel plane, and thus it should be understood that the description of the first surface 114a applies equally to the second surface 114b, thus the second surface 114b can include electrodes with similar electrode arrangement to the first surface 114a.

The first surface 114a includes guard electrodes 116, a plurality of continuous electrodes 118a-f, and a plurality of segmented electrode arrays 120a-e. Each of the plurality of continuous electrodes 118a-f can receive voltage (or current) signals, or can be connected to ground potential, and can generate a pseudopotential that can prevent or inhibit ions from approaching the first surface 114a. The plurality of continuous electrodes 118a-f can be rectangular in shape with the longer edge of the rectangle arranged along the direction of propagation of ions undergoing mobility separation, e.g., along the propagation axis which is parallel to the z-axis shown in FIG. 3. The plurality of continuous electrodes 118a-f can be separated from each other along a lateral direction, e.g., along the y-axis, which can be perpendicular to the direction of propagation, e.g., the z-axis.

Figures 4, 5:
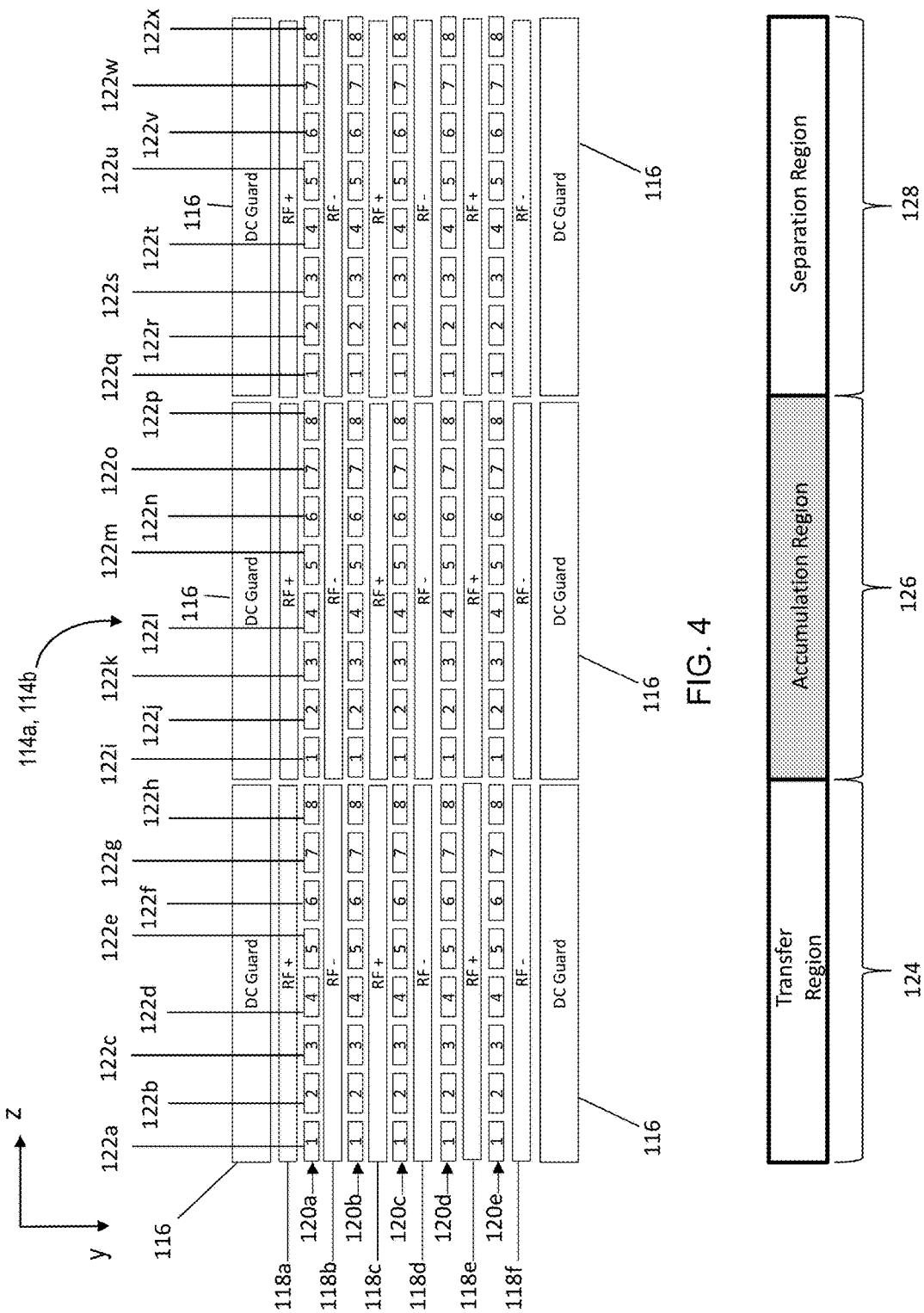
FIG. 4 is a schematic diagram illustrating a second exemplary arrangement of electrodes on a surface of the SLIM device of FIG. 2.
FIG. 5 is a block diagram showing exemplary regions of the SLIM device of FIG. 2.

Each of the plurality of segmented electrode arrays 120a-e can be placed between two continuous electrodes 118a-f, and includes a plurality of individual electrodes 122a-h, e.g., eight electrodes, sixteen electrodes, twenty-four electrodes, etc., that are arranged along (parallel to) the direction of propagation, e.g., along the z-axis. It should be understood that each segmented electrode array 120a-e can include more or less than eight electrodes, but should include at least three electrodes. For example, as shown in FIG. 4, the segmented electrode arrays 120a-e each include twenty-four electrodes 122a-x. Additionally, the individual electrodes 122a-x can be separated into individual groups that receive specific signals from the controller 108, discussed in greater detail below. The plurality of segmented electrode arrays 120a-e can receive a second voltage signal and generate a drive potential that can drive ions along the propagation axis or a DC voltage signal that can trap ions, which is discussed in greater detail below. That is, the first and second surfaces 114a, 114b, and the electrode arrangements thereof, can be implemented for different purposes, and thus have different functionalities, based upon the voltage settings applied to the continuous electrodes 118a-f, the segmented electrode arrays 120a-e, and the plurality of individual electrodes 122a-h.

The plurality of continuous electrodes 118a-f and the plurality of segmented electrode arrays 120a-e can be arranged in alternating fashion on the first surface 114a between the DC guard electrodes 116. The segmented electrodes 120a-e can be traveling wave (TW) electrodes such that each of the individual electrodes 122a-h of each segmented electrode array 120a-e receives a voltage signal that is simultaneously applied to all individual electrodes 122a-h, but phase shifted between adjacent electrodes 122a-h along the z-axis. However, the same individual electrodes, e.g., the first individual electrodes 122a, of the segmented electrode arrays 120a-e receive the same voltage signal without phase shifting.

The voltage signal applied to the individual electrodes 122a-h can be a sinusoidal waveform (e.g., an AC voltage waveform), a rectangular waveform, a DC square waveform, a sawtooth waveform, a biased sinusoidal waveform, a pulsed current waveform, etc., and the amplitude of the signal provided to the individual electrodes 122a-h can be determined based on the voltage waveform applied, e.g., in view of the phase shifting referenced above. For example, if a single wavelength of an AC voltage waveform extends over eight electrodes (e.g., the individual electrodes 122a-h), then amplitudes of the voltage signals applied to the individual electrodes 122a-h can be determined by selecting values from the AC waveform for phase shifts corresponding to the total number of electrodes (e.g., eight electrodes) associated with a single wavelength. For example, the phase shift between adjacent electrodes of the individual electrodes 122a-h is 45 degrees (360 degrees of a single wavelength cycle divided by 8). This can be achieved by electrically coupling the individual electrodes 122a-h to different traveling wave control circuits, e.g., AC control circuits, DC (square wave) control circuits, pulsed current control circuits, etc., that generate voltage signals that are phase shifted with respect to each other. Alternatively, the controller 108 could be a single traveling wave control circuit that can generate voltage signals that can be simultaneously applied to the electrodes 122a-h. It should be understood that the voltage or current waveform can take various forms, e.g., square, triangular, rectangular, sawtooth, etc., can be periodic, can be aperiodic, etc. For example, the controller 108 could be a traveling wave control circuit that can include one or more DC (square wave) control circuits that generate DC voltage signals and AC control circuits that generate sinusoidal signals.

As noted above, the controller 108 can include one or more pulsed voltage or current control circuits that can generate a pulsed voltage (or current) waveform, e.g., square, triangular, rectangular, sawtooth, etc. The pulsed voltage (or current) waveform can be periodic with no polarity reversal. The pulsed voltage (or current) control circuits can include multiple outputs that are electrically connected to the individual electrodes 122a-h. In some implementations, the controller 108 can be a pulsed voltage (or current) control circuit that can simultaneously apply multiple voltage signals (e.g., that constitute the pulsed waveform) to each of the individual electrodes 122a-h. The various pulse shapes of the voltage (or current) waveform can be generated by a superposition of DC voltage signals and sinusoidal signals. The controller 108 can determine the phase shift between the voltage signals generated by the various traveling wave control circuits. The shape/periodicity of the traveling potential waveform can be based on the phase shift between the voltage signals applied to adjacent electrodes 122a-h. The controller 108 can determine the amplitudes of the DC voltage signals generated by DC control circuits, and can determine the amplitude and/or frequency of the AC signal generated by the traveling wave control circuits.

The frequency of the voltage signals (e.g., AC signal) can determine the speed of the traveling potential waveform. An alternate approach to generating phase shifted AC signals for the voltage (or current) waveform, which generates the traveling potential waveform, is the use of multiphase transformers. This approach can provide control of the phase relationships between multiple voltage output signals based upon the connection scheme of the multiple secondary windings of the transformer. In this way, one or more input drive voltage(s) signal can be used to generate multiple phase dependent outputs with only analog circuitry. A key differentiation between this approach and the digital generation methods described above is the fact that the phase dependence can be dictated by the physical wiring of the transformer and may not be changed without making a physical change to the wiring. The phase relationships between digitally generated waveforms can be dynamically varied without a change in hardware.

As time progresses, the potential waveform (e.g., generated by AC waveform, sinusoidal voltage waveform, pulsed voltage [or current] waveform applied to the electrodes) can travel along the direction of propagation, e.g., along the z-axis. This can result in a change in the amplitude of the voltage applied to the individual electrodes 122a-h. For example, the voltage applied to the first individual electrode 122a during a first time step is applied to the adjacent individual electrode 122b during the next time step. The controller 108 can include one or more traveling wave control circuits that can generate the pulsed voltage/current waveform, AC waveform, etc. In some implementations, the controller can include one or more RF control circuits that can generate an RF voltage waveform, discussed in greater detail below.

The controller 108 can control the speed of the traveling potential waveform by controlling the frequency and/or phase of the AC/RF/pulsed voltage (or current) waveform applied to the individual electrodes 122a-h. As the potential waveform travels, ions introduced into the SLIM device 104 can be pushed along the direction of propagation and potentially separated along the z-axis based on their mobility, if desired. In this regard, the traveling waveform applied by the controller 108 can be used to transfer the ions without separating them or transfer the ions and separate them during the transfer based on mobility.

As noted above, the plurality of continuous electrodes 118a-f can be connected to one or more voltage control circuits, e.g., voltage control circuits in the controller 108, and receive RF signals therefrom. The RF voltages applied to the continuous electrodes 118a-f can be phase shifted with respect to adjacent continuous electrodes 118a-f. That is, adjacent continuous electrodes 118a-f can receive the same RF signal, but phase shifted by 180 degrees. Accordingly, in a first state, the first, third, and fifth electrodes 118a, 118c, 118e can have a positive polarity (indicated as RF+) while the second, fourth, and sixth continuous electrodes 118b, 118d, 118f can have a negative polarity (indicated as RF−). As time and the signal advances, the polarity of each of the continuous electrodes 118a-f switches. The foregoing functionality retains the ions between the first and second surfaces 114a, 114b and prevents the ions from contacting the first and second surfaces 114a, 114b.

As noted above, the SLIM device 104 can have more or less than eight individual electrodes 122a-h in each of the segmented electrode arrays 120a-e, and can include more or less than five segmented electrode arrays 120a-e and six continuous electrodes 118a-f depending on the functionality desired of the SLIM device 104. For example, FIG. 4 is a schematic diagram of the first and second surfaces 114a, 114b of the SLIM device 104 illustrating second and third exemplary arrangement of electrodes 116, 118a-f, 120a-e, 122a-x thereon. More specifically, the arrangement of electrodes 116, 118a-f, 120a-e, 122a-x shown in FIG. 4 is substantially the same as the arrangement shown in FIG. 3, but with twenty-four individual electrodes 122a-x for each of the segmented electrode arrays 120a-e, the six continuous electrodes 118a-f broken into sets of three, and the guard electrodes 116 broken into sets of three.

In this configuration, the first set of eight individual electrodes 122a-h can be used for a first function, e.g., to transfer ions with or without separating them, the second set of eight individual electrodes 122i-p can be used for a second function, e.g., to trap and accumulate ions, and the third set of eight individual electrodes 122q-x can be used for a third function, e.g., to separate ions while transferring them. For example, the controller 108 can provide a first waveform to the first set of eight individual electrodes 122a-h, a second waveform to the second set of eight individual electrodes 122i-p, and a third waveform to the third set of eight individual electrodes 122q-x. Additionally, each of the individual electrodes 122a-x can be individually controlled by the controller 108 and provided with a waveform or voltage (e.g., DC voltage value), or switched between different waveforms or voltages, depending on desired functionality. Accordingly, the individual electrodes 122a-x can be divided into groups as necessary and according to design considerations.

As shown in FIG. 5, which is a block diagram showing exemplary regions of the SLIM device 104 of FIG. 2, the individual electrodes 122a-x can be grouped into the different regions based on their desired functionality. For example, the SLIM device 104 can include a transfer region 124, an accumulation region 126, and a separation region 128. The transfer region 124 can have a traveling wave applied thereto which transfers ions to the accumulation region 126. The accumulation region 126 can trap and accumulate ions, e.g., through the implementation of one or more switching/gate electrodes. The separation region 128 can separate and transfer ions once released from the accumulation region 126. The electrode arrangement illustrated in FIG. 3 can be implemented in any of the transfer, accumulation, and separation regions 124, 126, 128, with the voltages being applied to the respective electrodes dictating the functionality. For example, the first set of eight individual electrodes 122a-h of FIG. 4 can be implemented as the transfer region 124, the second set of eight individual electrodes 122*i-p* of FIG. 4 can be implemented as the accumulation region 126, and the third set of eight individual electrodes 122*q-x* of FIG. 4 can be implemented as the separation region 128.

Additionally, as shown in FIGS. 4 and 5, the accumulation region 126 can be provided with separate sets of continuous electrodes 118*a-f* and separate sets of guard electrodes 116, which can be individually controlled and have different voltages applied thereto by the controller 108. This configuration allows for a different RF and DC voltages to be applied to the accumulation region 126. For example, the amplitude of the RF voltage applied to the continuous electrodes 118*a-f* in the accumulation region 126 can be reduced to avoid exciting the ions, and the RF voltage applied to the continuous electrodes 118*a-f* in the accumulation region 126 and the DC guard voltage applied to the guard electrodes 116 in the accumulation region 126 can be adjusted to match the voltage applied to the second set of individual electrodes 122*i-p* of the accumulation region 126.

Figure 6:
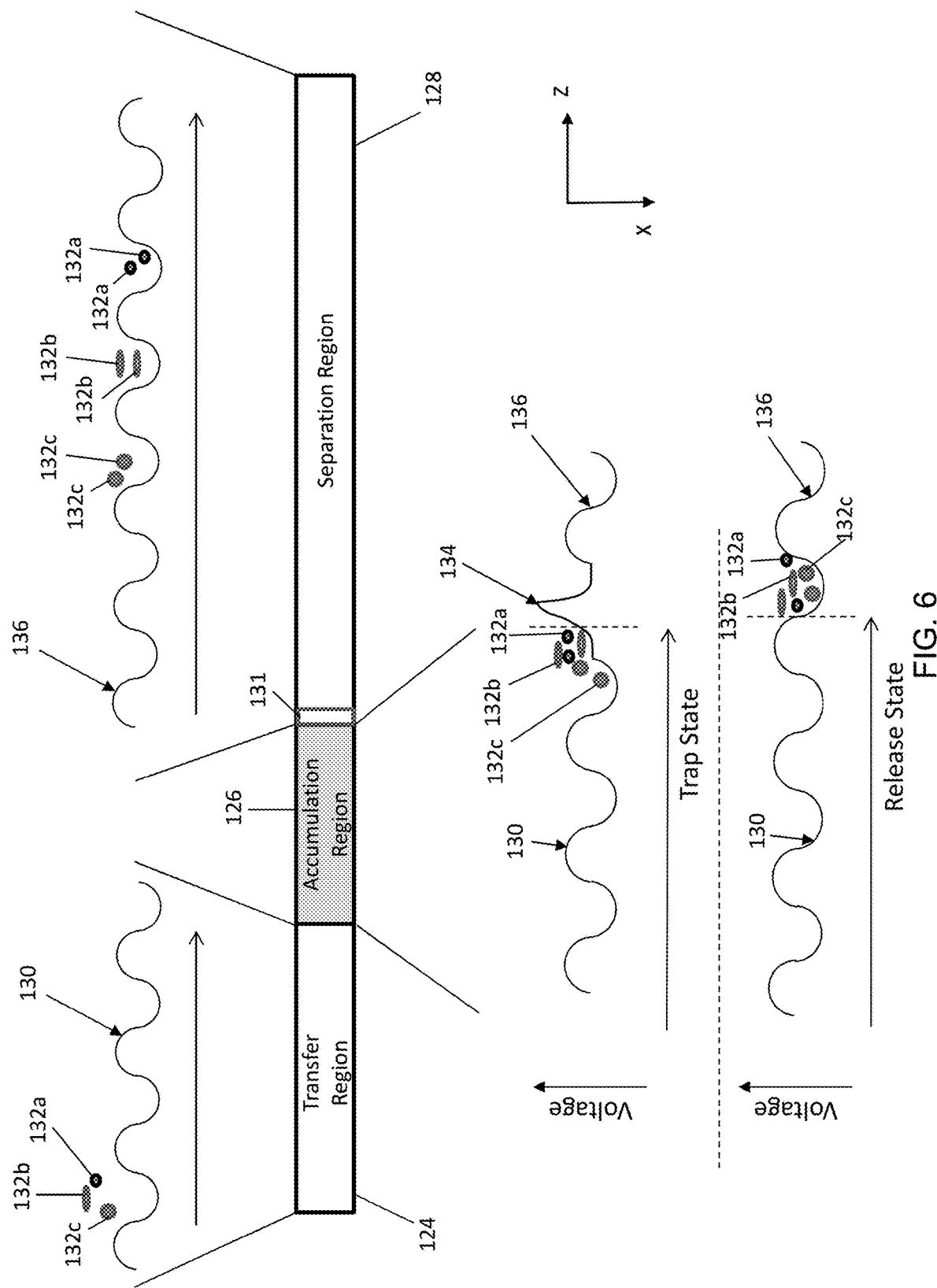
FIG. 6 is a schematic and block diagram illustrating a first set of exemplary waveforms applied to the exemplary regions of FIG. 5, including a high DC potential waveform for accumulating ions.

FIG. 6 is a schematic and block diagram illustrating a first set of exemplary waveforms applied to the regions 124, 126, 128 of the SLIM device 104, and exemplary ion motion through the regions 124, 126, 128. The transfer region 124 has a first traveling wave 130 applied thereto, which transfers the ions 132*a-c* along the propagation axis, e.g., the z-axis, and to the accumulation region 126. The first traveling wave 130 can be generated by the controller 108, and can be customized so as to transfer the ions 132*a-c* with or without separating the ions 132*a-c* based on mobility. The transfer region 124 can comprise a plurality of the individual electrodes 122*a-x* of each segmented electrode array 120*a-e*. For example, the first through eighth individual electrodes 122*a-h* for all segmented electrode arrays 120*a-e* can receive the first traveling wave 130 and transfer the ions 132*a-c* to the accumulation region 126. The accumulation region 126 can partially overlap the transfer region 124 in that the first traveling wave 130 extends into the accumulation region 126.

The accumulation region 126 can have two different states/modes of operation, e.g., a trap state and a release state, that it can operate in for different periods of time. When in the trap state/mode of operation, the first traveling wave 130 can extend into the accumulation region 126 and a single gate electrode 131, e.g., the first individual electrode 122*a* of each segmented electrode array 120*a-e* in the separation region 128 (for example, the seventeenth individual electrode 122*q* of FIG. 4) or the eighth individual electrode 122*h* of each segmented electrode array 120*a-e* in the accumulation region 126 (for example, the sixteenth individual electrode 122*p* of FIG. 4), can have the signal applied thereto switched from the first traveling wave 130 to a signal configured to trap or prevent the ions 132*a-c* from continued propagation. More specifically, the gate electrode receives a high DC potential voltage signal 134 from the controller 108 that is greater in potential than the voltage bias of the first traveling wave 130. The voltage bias of the first traveling wave 130 is generally a fixed DC voltage applied to the first traveling wave 130 to shift the waveform. As such, the first traveling wave 130 continuously transfers ions 132*a-c* provided to the SLIM device 104, e.g., from the ionization source 102, along the propagation axis until the ions 132*a-c* reach the gate electrode 131 where they are stopped, e.g., repelled, by the high DC potential voltage signal 134. Nonetheless, the continuously cycling first traveling wave 130 prevents the ions 132*a-c* from propagating in the opposite direction, e.g., in the negative z-axis direction, and instead traps the ions 132*a-c* against the high DC potential voltage signal 134 by continuously pushing the ions 132*a-c* in the propagation direction, e.g., the positive z-axis direction, which allows for the ions 132*a-c* to accumulate in the accumulation region 126. This essentially packetizes the ions 132*a-c* so that they can be collectively separated in the separation region 128.

Accordingly, in operation, ions 132*a-c* can be continuously fed to the SLIM device 104 when in the trap state/mode of operation until a sufficient number of ions have been accumulated, which can be determined by whether the space charge limit has been reached. More specifically, space charge effects limit the maximum number of charges that can be contained within a given length before ions are discharged. Generally, there is a space charge limit of approximately one million charges per one millimeter of path length in the SLIM device 104. Accordingly, if a single traveling wave segment, e.g., the electrode segment shown in and described in connection with FIG. 3 that includes six RF electrodes 118*a-f* and five segmented electrode arrays 120*a-e* having eight individual electrodes 122*a-h*, is used for accumulating ions and that segment is, for example, nine millimeters in length, then the space charge limit (e.g., accumulation capacity) is approximately nine million charges. That is, nine million charges can be accumulated before the space charge limit is exceed, at which point ions can be lost from the trap. It is noted that the space charge limit is based on the total charge value of all ions accumulated, and not the number of ions. For example, some ions may have a greater charge value, e.g., +40 or +50, and in such circumstances fewer ions would be accumulated than if ions having +10 charge were accumulated. Moreover, the foregoing assumes a single traveling wave segment having six RF electrodes 118*a*-118*f* and five segmented electrode arrays 120*a-e*, however, additional rows can be added to increase the accumulation capacity per unit length if additional capacity is required, e.g., in order to increase the sensitivity of the analysis. For example, a sixth segmented electrode array and an eighth continuous RF electrode could be added to the electrode configuration shown in FIG. 3 and FIG. 4, which would provide additional space for ion accumulation.

The gate electrode 131 can be a switchable electrode such that it can operate in the trap state for a first period of time until a sufficient number of ions have been accumulated, the signal applied thereto can then be switched to a release state, which the gate electrode 131 can operate in for a second period of time. For example, the signal can be switched from the high DC potential voltage signal 134 to a second traveling wave 136 so that it is in sync with the second traveling wave 136 applied to the separation region 128, which will cause the accumulated ions 132*a-c* to be released into the separation region 128. The second traveling wave 136, which can be generated by the controller 108, is applied to the electrodes of the separation region 128, and separates the ions 132*a-c* along the z-axis based on their mobility and pushes the ions 132*a-c* along the direction of propagation, e.g., the z-axis, toward the mass spectrometer 106 for analyzing. The separation region 128 can comprise a plurality of the individual electrodes 122*a-x* of each segmented electrode array 120*a-e*. For example, the seventeenth through twenty-fourth individual electrodes 122*q-x* for all segmented electrode arrays 120*a-e* (see FIG. 4) can receive the second traveling wave 136. It is noted that the transfer region 124 can also function as a separation region such that the first traveling wave 130 is the same as the second traveling wave 136, which can assist with syncing the first and second traveling waves 130, 136 when switching between the trap state/mode of operation and the release state/mode of operation.

Figure 7A:
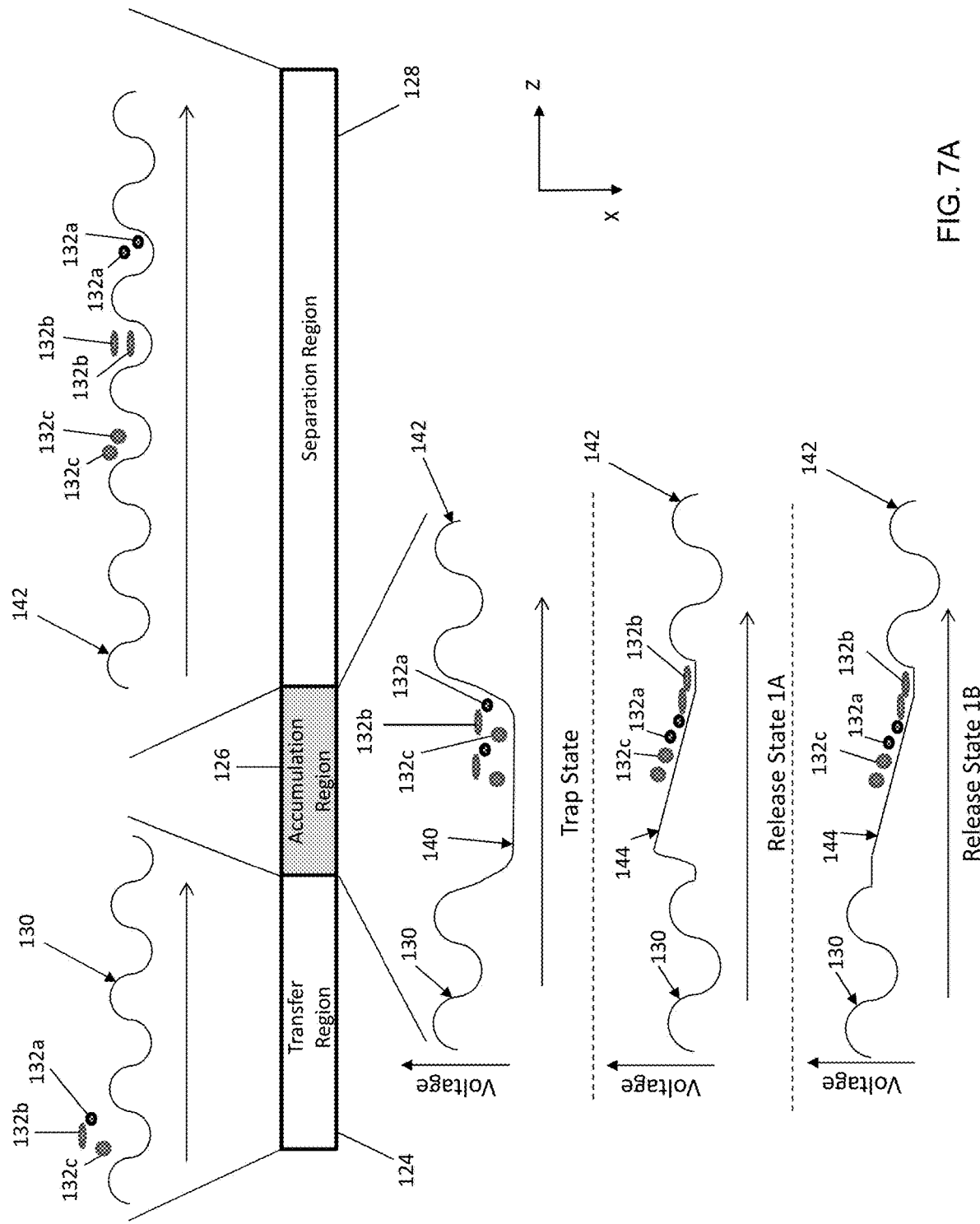
FIG. 7A is a schematic and block diagram illustrating a second set of exemplary waveforms applied to the exemplary regions of FIG. 5 including a DC potential well for accumulating ions and first release state waveforms.
Figure 7B:
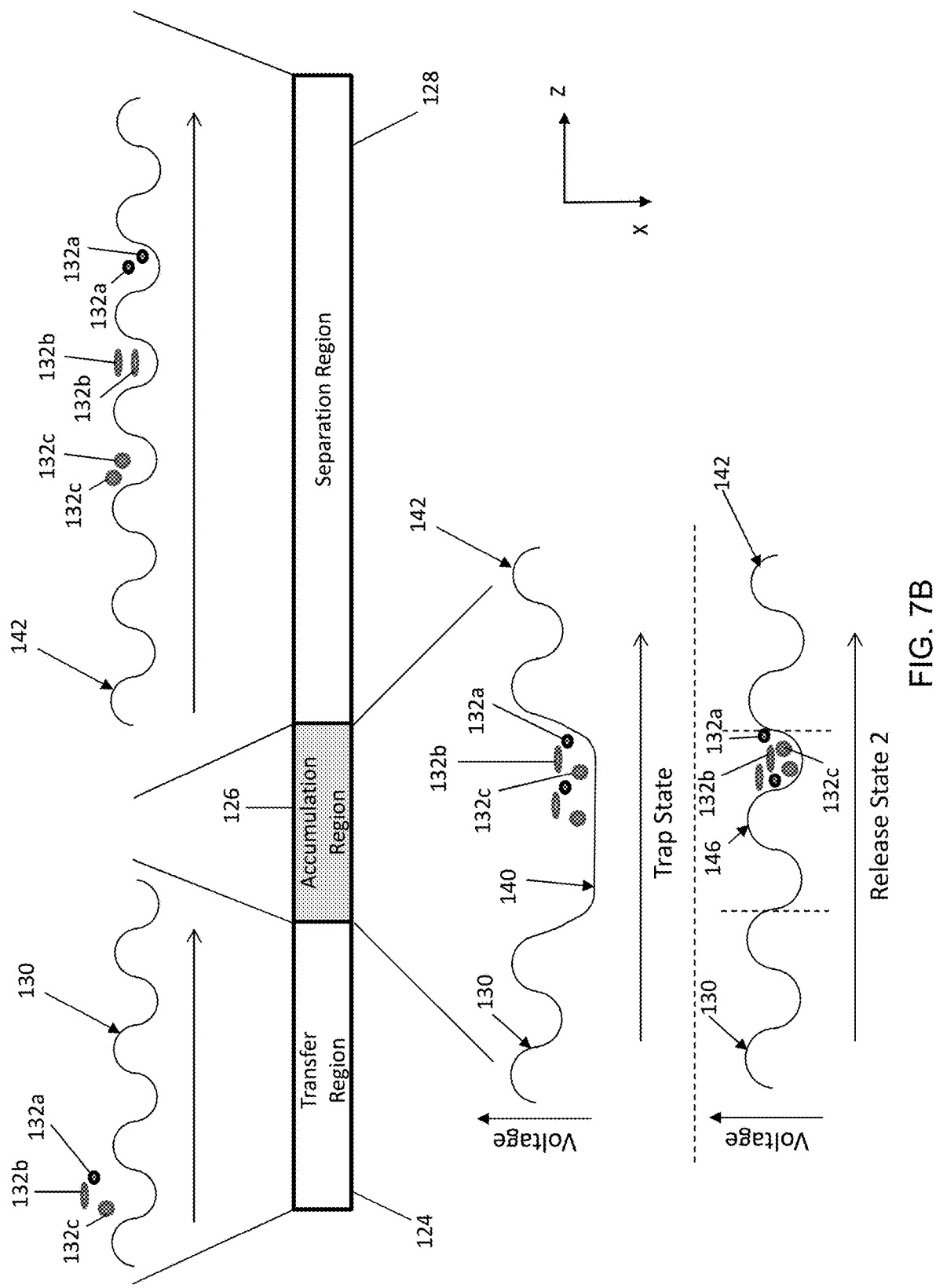
FIG. 7B is a schematic and block diagram illustrating the second set of exemplary waveforms as shown in FIG. 7A, but with a second release state waveform.

FIG. 7A is a schematic and block diagram illustrating a second set of exemplary waveforms applied to the regions 124, 126, 128 of the SLIM device 104 and exemplary ion motion through the regions 124, 126, 128, including first release state waveforms (release states 1A and 1B). FIG. 7B is a schematic and block diagram illustrating the second set of exemplary waveforms as shown in FIG. 7A, but with a second release state waveform.

The first traveling wave 130 is applied to the transfer region 124, as described above, and transfers the ions 132a-c along the propagation axis, e.g., the z-axis, and to the accumulation region 126. The first traveling wave 130 can be generated by the controller 108, and can be customized so as to transfer the ions 132a-c with or without separating the ions 132a-c based on mobility. The transfer region 124 can comprise a plurality of the individual electrodes 122a-x of each segmented electrode array 120a-e. For example, the first through eighth individual electrodes 122a-h for all segmented electrode arrays 120a-e can receive the first traveling wave 130 and transfer the ions 132a-c to the accumulation region 126. The accumulation region 126 can partially overlap the transfer region in that the first traveling wave 130 extends into the accumulation region 126.

The accumulation region 126 can have two different states/modes of operation, e.g., a trap state/mode of operation and a release state/mode of operation, that it can operate in for different periods of time. When in the trap state/mode of operation, the first traveling wave 130 can extend into the accumulation region 126 and plurality of gate/trap electrodes can have the signal applied thereto switched from the first traveling wave 130 to a signal configured to trap or prevent the ions 132a-c from continued propagation. For example, a couple of electrodes could be implemented as gate/trap electrodes, such as the first and second individual electrodes 122a, 122b of each segmented electrode array 120a-e (see FIG. 3) in the accumulation region 126 (e.g., the ninth and tenth individual electrodes 122i, 122j of FIG. 4) or the seventh and eighth individual electrodes 122g, 122h of each segmented electrode array 120a-e (see FIG. 3) in the accumulation region 126 (e.g., the fifteenth and sixteenth individual electrodes 122o, 122p of FIG. 4), or the entire array of individual electrodes 122a-h of each segmented electrode array 120a-e (see FIG. 3) in the accumulation region 126 (e.g., the ninth through sixteenth individual electrodes 122i-p of FIG. 4) could be implemented as gate/trap electrodes.

More specifically, the gate/trap electrodes (e.g., the seventh and eighth electrodes 122g, 122h) receive a low DC potential voltage signal 140 from the controller 108 for a first period of time, which creates a potential well (e.g., a DC potential well) that is lower in potential than the voltage bias of the first traveling wave 130 and the second traveling wave 142 of the separation region 128. As such, the first traveling wave 130 continuously transfers ions 132a-c provided to the SLIM device 104, e.g., from the ionization source 102, along the propagation axis until the ions 132a-c reach the gate/trap electrodes 122g, 122h where they are trapped as they are unable to overcome the potential of the second traveling wave 142 in the separation region 128. Similarly, the continuously cycling first traveling wave 130 prevents the ions 132a-c from propagating in the opposite direction, e.g., in the negative z-axis direction, and traps the ions 132a-c within the low potential well 140, which causes the ions 132a-c to accumulate in the accumulation region 126, e.g., within the low potential well 140. This essentially packetizes the ions 132a-c so that they can be collectively separated in the separation region 128.

Accordingly, in operation, ions 132a-c can be continuously fed to the SLIM device 104 when in the trap state/mode of operation until a sufficient number of ions have been accumulated in the low potential well 140 and the accumulation region 126, which, as discussed above, can be determined by whether the space charge limit has been reached. However, since the accumulation region 126, e.g., the low potential well 140, extends across a plurality of electrodes, the capacity of the trap can be controlled, as more than two electrodes can be used to create the low potential well in order to accumulate a greater number of ion charges. Moreover, additional rows can be added to increase the accumulation capacity per unit length if additional capacity is required, e.g., in order to increase the sensitivity of the analysis. For example, a sixth segmented electrode array and an eighth continuous RF electrode could be added to the electrode configuration shown in FIGS. 3 and 4, which would provide additional space for ion accumulation.

The gate/trap electrodes 122g, 122h can be switchable electrodes such that once a sufficient number of ions have been accumulated, the signal applied thereto can be switched into a release state. For example, as shown by release state 1A in FIG. 7A, the signal applied to the gate/trap electrodes 122g, 122h can be switched from the low DC potential voltage signal 140 to a ramped DC potential voltage signal 144 (e.g., a DC potential gradient) that decreases in potential and travels across the gate/trap electrodes 122g, 122h to push the accumulated/trapped ions 132a-c toward the separation region 128, which causes the accumulated ions 132a-c to be released into the separation region 128. The second traveling wave 142, which can be generated by the controller 108, is applied to the separation region 128 and is configured to interface or sync with the ramped DC potential voltage signal 144 such that the ions 132a-c are transferred from the accumulation region 126 to the separation region 128 for propagation and separation. The second traveling wave 142 separates the ions 132a-c along the z-axis based on their mobility and pushes the ions 132a-c along the direction of propagation, e.g., the z-axis, toward the mass spectrometer 106 for analyzing. The separation region 128 can comprise a plurality of the individual electrodes 122a-x of each segmented electrode array 120a-e. For example, the seventeenth through twenty-fourth individual electrodes 122q-x for all segmented electrode arrays 120a-e (see FIG. 4) can receive the second traveling wave 142. It is noted that the transfer region 124 can also function as a separation region such that the first traveling wave 130 is the same as the second traveling wave 136.

Alternatively, as shown by release state 1B in FIG. 7A, the second traveling wave 142 can be offset from the first traveling wave 130, e.g., a lower voltage bias can be applied to the second traveling wave 142 than to the first traveling wave 130. In this configuration, the DC potential voltage signal 140 could be configured to ramp down from the voltage bias of the first traveling wave 130 to the voltage bias of the second traveling wave 142 to transition and push the ions 132a-132c from the accumulation region 126 to the separation region 128 for propagation and separation.

Alternative to implementing the ramped DC potential voltage signal 144 during a release state/mode, the controller 108 can provide a third traveling wave 146 to the gate/trap electrodes 122g, 122h when in the release state/mode, as shown in FIG. 7B, which illustrates the second release state waveform. That is, the signal provided to the gate/trap electrodes 122g, 122h can be switched from the low DC potential voltage signal 140 to the third traveling wave 146, which can be configured to interface or sync with the first traveling wave 130 and/or the second traveling wave 142 so that it pushes the accumulated/trapped ions 132a-c toward and into the separation region 128 where the second traveling wave 142 is applied. The second traveling wave 142 can be generated by the controller 108 and configured to interface or sync with the third traveling wave 146 such that the ions 132a-c are transferred from the accumulation region 126 to the separation region 128 for propagation and separation, as discussed above.

Additionally, as noted in connection with FIG. 4 the accumulation region 126 can be provided with separate sets of continuous electrodes 118a-f and separate sets of guard electrodes 116, which can be individually controlled and have different voltages applied thereto by the controller 108. This configuration allows for a different RF and DC voltages to be applied to the accumulation region 126. For example, when the accumulation 126 is in a trap state, and thus receiving a low DC potential voltage signal 140, the amplitude of the RF voltage applied to the continuous electrodes 118a-f in the accumulation region 126 can be reduced to avoid exciting the ions, and the DC guard voltage applied to the guard electrodes 116 in the accumulation region 126 can be reduced to match the voltage applied to the individual electrodes 122i-p of the accumulation region 126, but maintained at a level to ensure that ions do not exit from the sides. Additionally, the RF voltage applied to the continuous electrodes 118a-f and the DC guard voltage applied to the guard electrodes 116 can adjusted when the accumulation region 126 is switched to the release state, which involves a change in voltage signal applied to the individual electrodes 122i-p. For example, if the voltage signal applied to the individual electrodes 122i-p is increased during a release state, then the DC guard voltage applied to the guard electrodes 116 can be increased to ensure that ions do not escape from the sides of the SLIM device 104.

Figure 8:
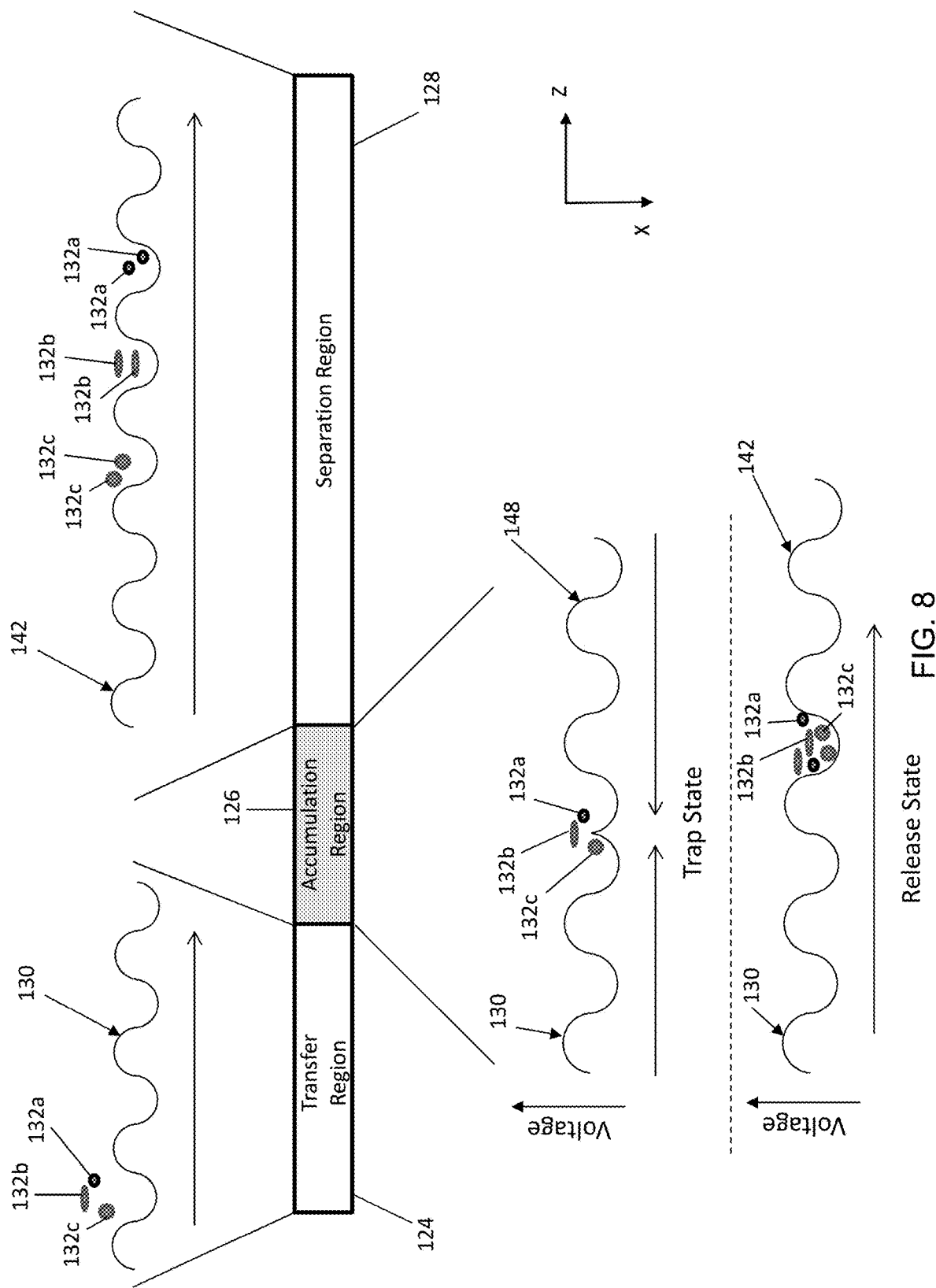
FIG. 8 is a schematic and block diagram illustrating a third set of exemplary waveforms applied to the exemplary regions of FIG. 5, including opposing traveling waves for accumulating ions.

FIG. 8 is a schematic and block diagram illustrating a third set of exemplary waveforms applied to the exemplary regions 124, 126, 128 of the SLIM device 104 and exemplary ion motion through the regions 124, 126, 128. In particular, FIG. 8 demonstrates the implementation of opposed traveling waves used to trap and accumulate ions. The first traveling wave 130 is applied to the transfer region 124, as described above, and transfers the ions 132a-c along the propagation axis, e.g., the z-axis, and to the accumulation region 126. The first traveling wave 130 can be generated by the controller 108, and can be customized so as to transfer the ions 132a-c with or without separating the ions 132a-c based on mobility. The transfer region 124 can comprise a plurality of the individual electrodes 122a-x of each segmented electrode array 120a-e. For example, the first through eighth individual electrodes 122a-h for all segmented electrode arrays 120a-e can receive the first traveling wave 130 and transfer the ions 132a-c to the accumulation region 126.

Similarly, the separation region 128 can have a second traveling wave 142 applied thereto, which can be generated by the controller 108. The separation region 128 can comprise a plurality of the individual electrodes 122a-x of each segmented electrode array 120a-e. For example, the seventeenth through twenty-fourth individual electrodes 122q-x for all segmented electrode arrays 120a-e (see FIG. 4) can receive the second traveling wave 142. Thus, the second traveling wave 142 can start where the first traveling wave 130 ends. In this regard, the second traveling wave 142 can be the same waveform as the first traveling wave 130 such that they essentially form a single continuous wave.

However, the SLIM device 104 can have two different states/modes of operation, e.g., a trap state/mode of operation and a release state/mode of operation, that it operates in for different periods of time. When in the trap state/mode of operation, the controller 108 can apply a third traveling wave 148 to the separation region for a period of time, e.g., to the seventeenth through twenty-fourth individual electrodes 122q-x, that travels in the opposite direction of the first traveling wave 130, e.g., toward the first traveling wave 130 along the negative direction of the z-axis. Accordingly, the first traveling wave 130 and the third traveling wave 148 can be opposing waves that meet at the accumulation region 126. Additionally, the third traveling wave 148 can have the same frequency and magnitude as the first traveling wave 124, but propagate in the opposite direction. In this configuration, the individual electrodes 122q-x of the separation region can be switchable such that during the trap state/mode of operation the controller 108 applies the third traveling wave 148 thereto and in a release state/mode of operation applies the second traveling wave 142 thereto.

As such, when the SLIM device 104 is operated in the trap state/mode of operation, the first traveling wave 130 continuously transfers ions 132a-c provided to the SLIM device 104, e.g., from the ionization source 102, along the propagation axis until the ions 132a-c reach the accumulation region 126, e.g., the point between the eighth electrode 122h and the ninth electrode 122i, where they are stopped due to the opposing first and third traveling waves 130, 148. That is, while the first traveling wave 130 pushes the ions 132a-c along the positive direction of the z-axis, the second traveling wave 148 pushes the ions 132a-c in the opposite direction in the negative direction of the z-axis. Thus, the continuously cycling third traveling wave 148 prevents the ions 132a-c from further propagating along the z-axis and across the SLIM device 104, and the continuously cycling first traveling wave 130 transfers the ions 132a-c to the accumulation region 126 and subsequently prevents the ions 132a-c from propagating in the opposite direction, e.g., along the z-axis in the negative direction. The opposing first and third traveling waves 130, 148 prevent the ions 132a-c located in the accumulation region 126 from traveling any significant distance along the z-axis, and thus trap the ions 132a-c and allow the ions 132a-c to accumulate in the accumulation region 126. This essentially packetizes the ions 132a-c so that they can be collectively separated in the separation region 128.

Accordingly, in operation, ions 132a-c can be continuously fed to the SLIM device 104 when in the trap state/mode of operation until a sufficient number of ions have been accumulated in the accumulation region 126, which, as discussed above, can be determined by whether the space charge limit has been reached. Moreover, additional rows can be added to increase the accumulation capacity per unit length if additional capacity is required, e.g., in order to increase the sensitivity of the analysis. For example, a sixth segmented electrode array and an eighth continuous RF electrode could be added to the electrode configuration shown in FIGS. 3 and 4, which would provide additional space for ion accumulation.

As previously noted, the separation region electrodes 122q-x can be switchable electrodes such that once a sufficient number of ions have been accumulated, the signal applied thereto can be switched into a release state. For example, the signal can be switched from the third traveling wave 148 to the second traveling wave 142 in sync with the first traveling wave 130 applied to the transfer region, which causes the accumulated ions 132a-c to be released into the separation region 128. The second traveling wave 136, which can be generated by the controller 108, is applied to the separation region 128, and separates the ions 132a-c along the z-axis based on their mobility and pushes the ions 132a-c along the direction of propagation, e.g., the z-axis, toward the mass spectrometer 106 for detection. It is noted that the transfer region 124 can also function as a separation region such that the first traveling wave 130 is the same as the second traveling wave 136, which can assist with syncing the first and second traveling waves 130, 136 when switching between the trap state/mode of operation and the release state/mode of operation.

Figure 9:
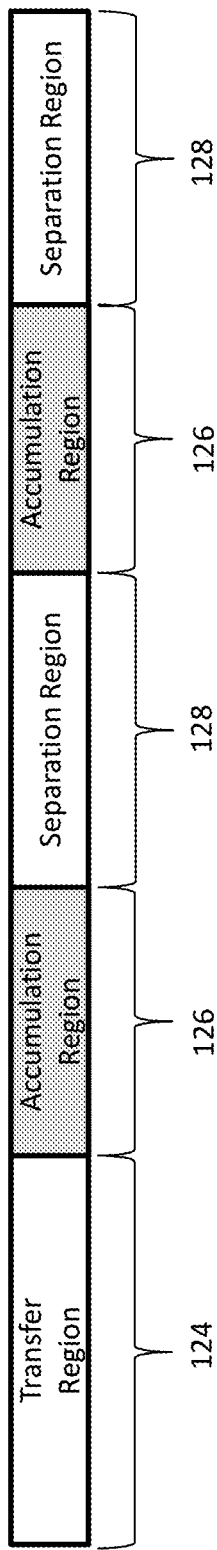
FIG. 9 is a block diagram illustrating an exemplary arrangement of regions in an IMS system of the present disclosure for accumulating and separating ions.

FIG. 9 is a block diagram illustrating an exemplary arrangement of transfer, accumulation, and separation regions 124, 126, 128 in the IMS system 100 of the present disclosure for accumulating and separating ions. As shown in FIG. 9, the IMS system 100 can include a plurality of transfer regions 124, accumulation regions 126, and separation regions 128 in order to further increase the resolution. It is noted that alternative arrangements and configurations are contemplated by the present disclosure. In this regard, it is noted that it is not necessary that the different regions 124, 126, 128 be placed in a straight line. Instead, for example, the transfer region 124 may be placed perpendicular to the accumulation or separation regions 126, 128. Additionally, gates can be implemented with the present disclosure in order to, for example, control the flow of ions from the transfer region 124 to the accumulation region 126, or from the separation region 128 to a second accumulation region 126.

Figure 10:
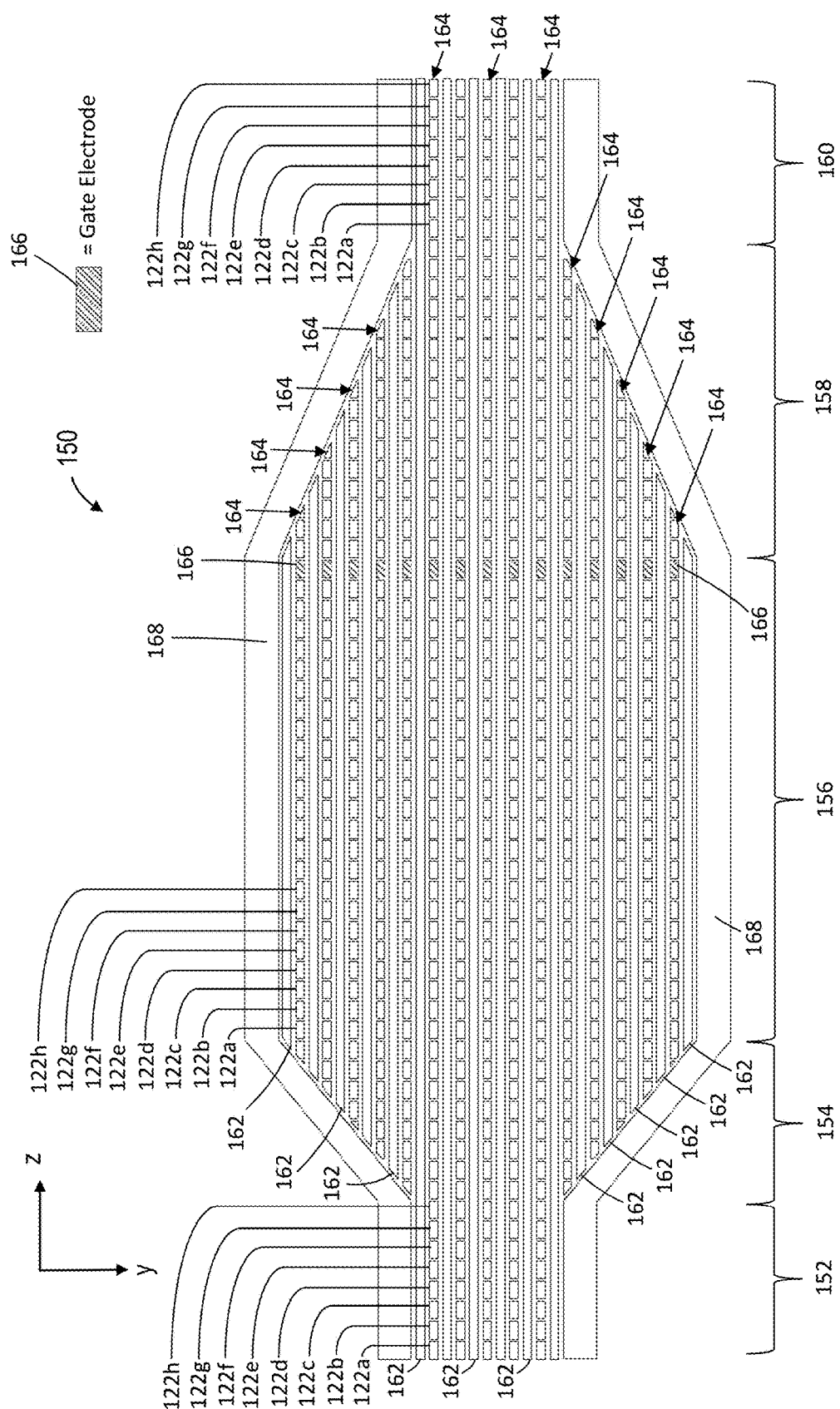
FIG. 10 is a schematic diagram of an exemplary accumulation region of the present disclosure.

FIG. 10 is a schematic diagram of an exemplary accumulation region 150 of the present disclosure, which can be implemented, for example, as the accumulation region 126 shown and described in connection with FIGS. 5-9. That is, it should be understood that the description of the accumulation region 126 and functionality thereof is equally applicable to the accumulation region 150 illustrated in FIG. 10, including the above-described applied waveforms, trap states, and release states.

The accumulation region 150 includes an inlet section 152, an inlet transition section 154, an ion accumulation section 156, an outlet transition section 158, and an outlet section 160. Each of the sections 150-160 generally includes a plurality of rows of continuous electrodes 162 and a plurality of segmented electrode arrays 164, the number of which can vary between sections 150-160, as discussed in greater detail below. In this regard, some of the rows of continuous electrodes 162 and segmented electrode arrays 164 can extend through more than one section 150-160 with some extending through all sections 150-160 of the accumulation region 150, as shown in FIG. 10. The continuous electrodes 162 can be substantially similar to the continuous electrodes 118a-f shown and described in connection with FIGS. 3 and 4, while the segmented electrode arrays 164 can be substantially similar to the plurality of segmented electrode arrays 120a-e shown and described in connection with FIGS. 3 and 4. Similar to the segmented electrode arrays 120a-e, the segmented electrode arrays 164 can include a plurality of individual electrodes 122a-h. It is also noted that for the ease of illustration every continuous electrode 162, segmented electrode array 164, and individual electrode 122a-h is not labelled in FIG. 10, but instead a suitable representative number of elements are labelled.

The inlet section 152 and the outlet section 160 can each include, for example, six rows of continuous electrodes 118a-f and five segmented electrode arrays 165. However, it should be understood that more or less rows and segmented electrode arrays can be included. The inlet section 152 can be configured to receive ions from another section of the SLIM device 104, while the outlet section 160 can be configured to provide ions to another section of the SLIM device 104. For example, the inlet and outlet sections 152, 160 can be positioned adjacent to a transfer region 124, a separation region 128, a different accumulation region 126, 150, or any other region of the SLIM device 104 so as to receive ions therefrom or provide ions thereto. Accordingly, the voltage signals, e.g., the traveling wave voltage signal, applied to the individual electrodes 122a-h of the segmented electrode arrays 165 of the inlet section 152 and the outlet section 160 can be coordinated with the voltage signals applied to the adjacent section of the SLIM device 104 so that they are fully integrated and compatible. It should also be understood that the present disclosure contemplates at least one embodiment in which the inlet section 152 can be additionally and/or alternatively implemented also as an outlet and the outlet section 160 can be additionally and/or alternatively implemented as an inlet. For example, the ion accumulation section 156 could be implemented not only to accumulate ions, but also as a switching region that selectively directs ions to either the inlet section 152 (being utilized as an outlet) or the outlet section 160.

The inlet transition section 154 extends from the inlet section 152 to the ion accumulation section 156 and expands in width as it progresses along the z-axis from the inlet section 152 to the ion accumulation section 156. Accordingly, the width of the inlet transition section 154 along the y-axis is greater at a position adjacent the ion accumulation section 156 than it is at a position adjacent the inlet section 152. Additionally, the number of rows of continuous electrodes 162 and segmented electrode arrays 164 gradually increases as the width of the inlet transition section 154 widens. Conversely, the outlet transition section 158 tapers and reduces in width as it progresses along the z-axis from the ion accumulation section 156 to the outlet section 160. Accordingly, the width of the outlet transition section 158 along the y-axis is greater at a position adjacent the ion accumulation section 156 than it is at a position adjacent the outlet section 160. Additionally, the number of rows of continuous electrodes 162 and segmented electrode arrays 164 gradually decreases as the width of the outlet transition section 158 reduces.

The accumulation region 150 is designed so that the ion accumulation section 156 is wider, e.g., along the y-axis that is perpendicular to the axis of ion propagation (the z-axis in FIG. 10), than the inlet section 152, the outlet section 160, and/or other portions of the path through the SLIM device 104. The accumulation region 150 is also designed such that the inlet transition section 154 and the outlet transition section 158 provide a gradual transition between the inlet and outlet sections 152, 160 and the accumulation section 156. Accordingly, the accumulation section 156 includes more rows of electrodes, e.g., rows of continuous electrodes 162 and segmented electrode arrays 164, than the other portions of the path through the SLIM device 104. For example, as shown in FIG. 10, the accumulation section 156 can include sixteen rows of continuous electrodes 162 and fifteen segmented electrode arrays 164 while the inlet section 152 and the outlet section 160, which are designed to interface with other portions of the path through the SLIM device 104, include six rows of continuous electrodes 162 and five segmented electrode arrays 164.

Additionally, the segmented electrode arrays 164 of the accumulation section 156 can be divided into multiple groups or segments as described in connection with FIG. 5. For example, each segmented electrode array 164 of the accumulation section 156 can include three groups or segments of eight individual electrodes 122*a-h* (e.g., twenty-four electrodes). The number of segmented electrode array groups and/or individual electrodes 122*a-h* per segmented electrode array group can be increased or decreased depending on implementation and experimental needs. Additionally, the individual electrodes 122*a-h* of the accumulation section's 156 segmented electrode arrays 164 can receive a traveling wave signal independent from the transition sections 154, 158, the inlet section 152, and the outlet section 160, which allows for the traveling wave direction, and thus direction of ion travel through the accumulation section 156, to be switched as needed. It should also be understood that the accumulation region 150 can be operated in the same fashion as shown and described in connection with FIGS. 6-8.

Moreover, each segmented electrode array 164 of the accumulation section 156 can have one or more gate electrodes 166, e.g., the eighth electrode 122*h* of the third segmented electrode array group, that can have a signal applied thereto to trap or prevent the ions 132*a-c* from continued propagation through the accumulation region 150. More specifically, the gate electrodes 166 can receive a high DC voltage signal from the controller 108 and in turn generate a high DC electric field (V/m) to trap ions within the accumulation section 156 as they are provided thereto by way of the inlet section 152, the inlet transition section 154, and the individual electrodes 122*a-h* preceding the gate electrodes 166. The accumulated ions are also retained laterally, e.g., in the y-axis, by DC guard electrodes 168 that flank the sections 152-160 of the accumulation region 150 and function in accordance with the guard electrodes 116 shown and described in connection with FIGS. 3 and 4. The expanded width of the accumulation section 156 allows it to hold more ions before encountering space charge issues compared to a narrower accumulation section, e.g., an accumulation section 156 that is the same width as the inlet section 152 or the remainder of the path through the SLIM device 104.

Once a desired number of ions are accumulated in the accumulation section 156, the high DC voltage signal can be removed and a traveling wave signal can be applied that is coordinated with the traveling wave signal applied to the other individual electrodes 122*a-h* within the accumulation section 156, as well as with the traveling wave signal applied to the outlet transition section 158. Once the high DC voltage signal is removed and the traveling wave signal is applied, the ions will be urged into the outlet transition section 158.

As previously noted, the outlet transition section 158 tapers from the ion accumulation section 156 to the outlet section 160. For example, the outlet transition section 158 shown in FIG. 10 narrows from thirty-one rows to eleven rows. This taper allows for ions to exit the accumulation section 156 and transfer to the outlet section 160 while generally avoiding reaching the space charge limit and being discharged due to space charge effects. In this regard, faster ions, e.g., ions having a greater ion mobility, will exit the accumulation section 156 more quickly than slower ions causing the ions to separate as they traverse the outlet transition section 158. Accordingly, a larger area is necessary immediately adjacent the gate electrodes 166 to accommodate the cumulative charge of the released ions, which have not yet separated at the beginning of the outlet transition section 158, and prevent the ions from reaching the space charge limit. However, as the ions separate the cumulative charge of the released ions at any given position along the length of the outlet transition section 158 will reduce, thus allowing the width of the outlet transition section 158 to be gradually reduced to match the width of the outlet section 160. Additionally, the ions are retained within the outlet transition section 158 and prevented from exiting laterally, e.g., along the y-axis, by the DC guard electrodes 168. It should be understood that the length of the outlet transition section 158 and the slope of the taper thereof can be adjusted depending on the number of charges accumulated in the ion accumulation region 156. For example, the outlet transition section 158 shown in FIG. 10 has a length of sixteen individual electrodes 122*a-h*, e.g., two groups of eight individual electrodes 122*a-h*, but can be provided as eight individual electrodes 122*a-h* if such is determined to be sufficient. The outlet section 160 receives the ions from the outlet transition section 158 and transfers the ions to another section of the SLIM device 104.

Figure 11:
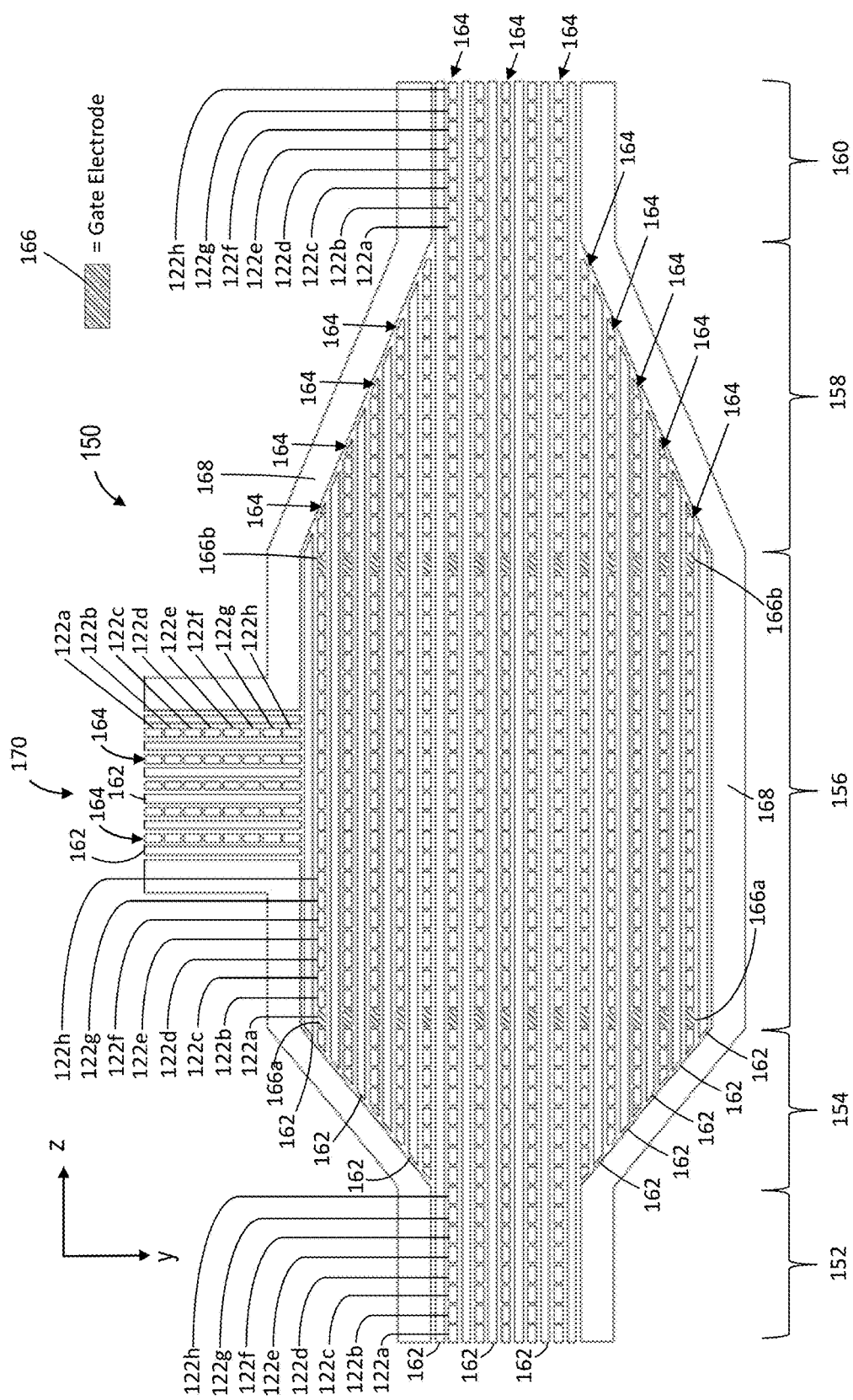
FIG. 11 is a schematic diagram of the exemplary accumulation region of FIG. 10 with a lateral inlet section.

FIG. 11 is a schematic diagram of the exemplary accumulation region 150 of FIG. 10 with a lateral inlet section 170 connected thereto. Specifically, in some aspects of the present disclosure, one or both lateral sides of the ion accumulation section 156 can have an opening therein with a lateral inlet section 170 positioned adjacent thereto. The lateral inlet section 170 can be substantially similar to the inlet section 152 and can include a plurality of columns of continuous electrodes 162 and a plurality of segmented electrode arrays 164 (oriented vertically along the y-axis instead of horizontally along the z-axis as in the inlet section 152) including a plurality of individual electrodes 122*a-h*. The lateral inlet section 170 is configured to transfer ions directly into the ion accumulation section 156.

The ion accumulation section 156 can be utilized to accumulate ions therein and can function in accordance with the above description provided in connection with FIG. 10. In particular, the gate electrodes 166*a*, 166*b* can receive a high DC voltage signal from the controller 108 and in turn generate a high DC electric field (V/m) to trap ions within the accumulation section 156 as they are provided thereto by way of the lateral inlet section 170. In this regard, the ion accumulation section 156 can include two sets of gate electrodes 166*a*, 166*b* on opposite sides thereof providing a confinement zone there between.

Once a desired number of ions are accumulated in the accumulation section 156 the ions can be transferred to either the outlet section 160 or the inlet section 152, which could function as an outlet section so long as the appropriate traveling wave is applied thereto and to the inlet transition section 154. In particular, if ions are to be sent to the outlet section 160, then the high DC voltage signal is removed from the right side gate electrodes 166*b* and a traveling wave signal that travels along the z-axis in the positive direction is applied to the individual electrodes 122*a-h* within the accumulation section 156 to push the ions into the outlet transition section 158 and subsequently the outlet section 160 where they can be provided to another path section of the SLIM device 104. Alternatively, if ions are to be sent to the inlet section 152, then the high DC voltage signal is removed from the left side gate electrodes 166*a* and a traveling wave signal that travels along the z-axis in the negative direction is applied to the individual electrodes 122*a-h* within the accumulation section 156, the inlet transition section 154 (functioning in similar fashion to the outlet transition section 158), and the inlet section 152

(functioning in similar fashion to the outlet section 160) to push the ions into the inlet transition section 154 and subsequently the inlet section 152 where they can be provided to another path section of the SLIM device 104. Accordingly, the ion accumulation section 156 is independently controllable and can be utilized to direct ions in different directions. Thus, the accumulation region 150 can be utilized not only to accumulate ions, but also as a directional switch. It should also be understood that the accumulation region 150 could also be utilized as a directional switch without first accumulating ions.

Additionally, it should be understood that the transition sections 154, 158 can be substantially similarly configured and sized, e.g., with the same length and/or slope, or of different configurations and/or shapes as shown in FIG. 11. For example, the design of the transition sections 154, 158 could be specifically tailored based on the desired implementation and the path section of the SLIM device 104 positioned subsequent thereto.

Other embodiments are within the scope and spirit of the disclosed subject matter. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. Further, in the present disclosure, like-named components of the embodiments generally have similar features, and thus within a particular embodiment each feature of each like-named component is not necessarily fully elaborated upon.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor can receive instructions and data from a read-only memory or a random access memory or both. The essential elements of a computer are a processor for executing instructions and one or more memory devices for storing instructions and data. Generally, a computer can also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

What is claimed is:

1. An apparatus for ion accumulation, comprising:
 a first region configured to receive ions and generate a first drive potential configured to guide the ions across the first region; and
 a second region configured to receive the ions from the first region, switch between a first state and a second state, the second region including a plurality of segmented electrodes which extend axially across the second region and generate a first electric field when in the first state, and generates a second electric field when in the second state;
 wherein the first electric field includes a second drive potential generated by a first electrode group of the segmented electrodes and a gating potential generated by at least one electrode of a second electrode group of the segmented electrodes, wherein the first electric field is configured to cause ions to accumulate in the second region and prevent the ions from entering a third region, and
 wherein the second electric field includes a third drive potential generated by the segmented electrode that is configured to guide the ions toward the third region and separate the ions based on mobility as they are guided toward the third region.

2. The apparatus of claim 1, wherein the first electric field is generated at least in part by a DC voltage.

3. The apparatus of claim 2, wherein the first electric field includes the second drive potential and a potential wall generated by the DC voltage, the potential wall having an effective potential that is greater than a maximum effective potential of the second drive potential.

4. The apparatus of claim 2, wherein the first electric field includes a potential well generated at least in part by the DC voltage.

5. The apparatus of claim 4, wherein the first electric field further includes the second drive potential and a magnitude of the DC voltage is less than a DC bias of the second drive potential, thereby generating the potential well.

6. The apparatus of claim 1, wherein the second electric field includes at least one of a traveling wave and DC potential gradient.

7. The apparatus of claim 1, wherein
 the second electric field is a first traveling wave,
 the third region is configured to receive the ions from the second region and generate a fourth drive potential configured to separate the ions based on mobility,
 the fourth drive potential is a second traveling wave, and
 the second traveling wave is synchronized with the first traveling wave when the second region is in the second state.

8. The apparatus of claim 1, wherein
 the first region includes a plurality of electrodes that extend across the first region and are configured to generate the first drive potential.

9. The apparatus of claim 8, comprising:
 a controller configured to:
  apply a first voltage signal to the plurality of electrodes of the first region, the plurality of electrodes configured to generate the first drive potential based on the first voltage signal,
  apply a second voltage signal to the at least one electrode of the second electrode group of the segmented electrodes of the second region, the at least one electrode configured to generate the gating potential of the first electric field based on the second voltage signal, and
  apply a third voltage signal to the at least one electrode segment of the segmented electrodes of the second region, the at least one electrode segment configured to generate the third drive potential of the second electric field based on the third voltage signal,
 wherein when the apparatus is in a first mode of operation the controller applies the second voltage signal to the segmented electrodes placing the second region in the first state, and when the apparatus is in a second mode of operation the controller applies the third voltage signal to the segmented electrodes placing the second region in the second state.

10. The apparatus of claim 1, wherein the second region includes a plurality of rows of radio frequency (RF) electrodes and a plurality of traveling wave (TW) electrode arrays, each of the plurality of TW electrode arrays including at least three individual electrodes.

11. A method of ion accumulation, comprising:
 introducing ions into an apparatus for ion accumulation having a first region, a second region, and a third region;
 generating a first drive potential within the first region for guiding the ions across the first region;
 transferring the ions from the first region to the second region with the drive potential;
 generating a first electric field within the second region for causing ions to accumulate in the second region and preventing the ions from entering the third region using a plurality of segmented electrodes which extend axially across the second region, wherein the first electric field includes a second drive potential generated by a first electrode group of the segmented electrodes and a gating potential generated by at least one electrode of a second electrode group of the segmented electrodes;
 accumulating ions in the second region using the first electric field;
 switching the first electric field generated within the second region to a second electric field, the second electric field including a third drive potential generated by the segmented electrode;
 guiding the accumulated ions toward the third region using the second electric field; and separating the ions based on mobility as they are guided toward the third region using the second electric field.

12. The method of claim 11, wherein the first electric field is generated at least in part by a DC voltage.

13. The method of claim 12, wherein the first electric field includes the second drive potential and a potential wall generated by the DC voltage, the potential wall having an effective potential that is greater than a maximum effective potential of the second drive potential.

14. The method of claim 12, wherein the first electric field includes a potential well generated at least in part by the DC voltage.

15. The method of claim 14, wherein the first electric field includes the second drive potential and a magnitude of the DC voltage is less than a DC bias of the second drive potential, thereby generating the potential well.

16. The method of claim 11, wherein the second electric field includes at least one of a traveling wave and DC potential gradient.

17. The method of claim 11, comprising:
transferring the ions from the second region to the third region; and
generating a fourth drive potential within the third region, wherein the second electric field is a first traveling wave, the fourth drive potential is a second traveling wave configured to separate the ions based on mobility, and the second traveling wave is synchronized with the first traveling wave.

18. The method of claim 11, wherein
the first region includes a plurality of electrodes that extend across the first region, the plurality of electrodes generating the first drive potential.

19. The method of claim 11, wherein the second region includes a plurality of rows of radio frequency (RF) electrodes and a plurality of traveling wave (TW) electrode arrays, each of the plurality of TW electrode arrays including at least three individual electrodes.

20. The apparatus of claim 1, wherein the second drive potential generated by the first electric field includes a first traveling wave that travels toward the third region and the gating potential generated by the first electric field includes a second traveling wave that travels in a direction opposite the first traveling wave toward the first region.

21. The method as recited in claim 13, wherein the second drive potential generated by the first electric field includes a first traveling wave that travels toward the third region and the gating potential generated by the first electric field includes a second traveling wave that travels in a direction opposite the first traveling wave toward the first region.

22. An apparatus for ion accumulation, comprising:
a first region configured to receive ions and generate a first drive potential configured to guide the ions across the first region; and
a second region configured to receive the ions from the first region, switch between a first state and a second state, generate a first electric field when in the first state, and generate a second electric field when in the second state;
wherein the first electric field is configured to cause ions to accumulate in the second region and prevent the ions from entering a third region, and
wherein the second electric field is a first traveling wave and is configured to guide the ions toward the third region and separate the ions based on mobility as they are guided toward the third region; and
wherein the third region is configured to receive the ions from the second region and generate a second drive potential configured to separate the ions based on mobility,
the second drive potential is a second traveling wave, and
the second traveling wave is synchronized with the first traveling wave when the second region is in the second state.

* * * * *